United States Patent
Kaneko et al.

(10) Patent No.: US 6,992,737 B2
(45) Date of Patent: Jan. 31, 2006

(54) COLOR FILTER SUBSTRATE, ELECTROOPTIC DEVICE AND ELECTRONIC APPARATUS, AND METHODS FOR MANUFACTURING COLOR FILTER SUBSTRATE AND ELECTROOPTIC DEVICE

(75) Inventors: Hideki Kaneko, Shiojin (JP); Keiji Takizawa, Hotaka-machi (JP); Tomoyuki Nakano, Toyoshina-machi (JP)

(73) Assignee: Seiko Epson Corporation, (JP)

( * ) Notice: Subject to any disclaimer, the term of this patent is extended or adjusted under 35 U.S.C. 154(b) by 64 days.

(21) Appl. No.: 10/361,033

(22) Filed: Feb. 6, 2003

(65) Prior Publication Data

US 2003/0223021 A1 Dec. 4, 2003

(30) Foreign Application Priority Data

Mar. 8, 2002 (JP) .............................. 2002-063852

(51) Int. Cl.
G02F 1/1335 (2006.01)

(52) U.S. Cl. ........................ 349/106; 349/111; 349/114; 349/64

(58) Field of Classification Search ................ 349/106, 349/110, 113, 64, 112, 111
See application file for complete search history.

(56) References Cited

U.S. PATENT DOCUMENTS

| | | | |
|---|---|---|---|
| 5,910,829 A * | 6/1999 | Shimada et al. ............ | 349/110 |
| 6,281,952 B1 | 8/2001 | Okamoto et al. | |
| 6,384,882 B1 * | 5/2002 | Nagayama et al. ......... | 349/110 |
| 6,445,432 B2 | 9/2002 | Yamamoto et al. | |
| 6,608,660 B1 | 8/2003 | Okamoto et al. | |

FOREIGN PATENT DOCUMENTS

| | | |
|---|---|---|
| JP | 6-33133 | 4/1994 |
| JP | 10-062768 | 3/1998 |
| JP | 11-242226 | 9/1999 |
| JP | 11-305248 | 11/1999 |
| JP | 2000-029014 | 1/2000 |
| JP | 2000-111894 | 4/2000 |
| JP | 2000-267077 | 9/2000 |
| JP | 2000-298271 | 10/2000 |
| JP | 2001-033768 | 2/2001 |

* cited by examiner

Primary Examiner—Tarifur R. Chowdhury
Assistant Examiner—Tai Duong
(74) Attorney, Agent, or Firm—Harness, Dickey & Pierce, P.L.C.

(57) ABSTRACT

A liquid crystal device 1 has liquid crystal 110 provided between a counter substrate 2a and a color filter substrate 2b. The liquid crystal device 1 has a pixel region 100, a first peripheral region 101 surrounding this pixel region 100, and a second peripheral region 102 surrounding the first peripheral region 101. In the first peripheral region 101, a color layer 120 is disposed which is formed of the same color material as that for a reflective blue color layer 150B disposed in the pixel region 100. In the second peripheral region 102, a laminate film 140 composed of color layers 140B, 140R, and 140B is disposed, these color layers described above being formed of the same color materials as those for a non-reflective blue color layer 160B, a non-reflective red color layer 160R, and a non-reflective green color layer 160G, respectively.

15 Claims, 17 Drawing Sheets

COLOR FILTER SUBSTRATE, ELECTROOPTIC DEVICE AND ELECTRONIC APPARATUS, AND METHODS FOR MANUFACTURING COLOR FILTER SUBSTRATE AND ELECTROOPTIC DEVICE

TECHNICAL FIELD OF THE INVENTION

The present invention relates to color filter substrates for use in electrooptic devices performing color display, to electrooptic devices and electronic apparatuses, both using the color filter substrates, and to methods for manufacturing a color filter substrate and an electrooptic device.

DESCRIPTION OF THE RELATED ART

An active matrix color liquid crystal device using switching elements, which is one example of an electrooptic device, is formed of liquid crystal used as an electrooptic material provided between a color filter substrate and a counter substrate opposing thereto.

In liquid crystal devices using, for example, TFD (Thin Film Diode) elements as a switching element, a plurality of line wires arranged in a stripe pattern are disposed on the counter substrate, and pixel electrodes are connected to the line wires via the TFD elements. In addition, on the color filter substrate, a plurality of electrodes arranged in a stripe pattern are provided so as to perpendicularly intersect the line wires on the counter substrate and to oppose the pixel electrodes. Furthermore, on the color filter substrate, red color layers (R), blue color layers (B), and green color layers (G) are disposed for performing color display. In this type of liquid crystal device, each point at which the pixel electrode and the electrode on the color filter substrate intersects each other forms one dot, and one of picture elements R, G, and B is disposed for each dot thus formed. Three color dots R, G and B form one unit functioning as one pixel.

Heretofore, a shading region made of a metal film is provided to surround a pixel region in which the pixels are formed, so that the periphery of the pixel region is darkened, that is, the light transmittance is decreased. Accordingly, the contrast of the pixel region is enhanced, and the display quality is improved thereby.

However, in the liquid crystal devices having the structure described above, since it is not necessary to dispose the color layers R, G, and B in the shading region which has no contribution to display performance, the change in thickness becomes large in the vicinity of the boundary between the pixel region and the shading region. Accordingly, the change in cell gap becomes large in the vicinity of the boundary between the pixel region and the shading region, resulting in orientation defect of the liquid crystal in the peripheral region of the display screen. As a result, shading cannot be sufficiently performed only by the metal film, and a problem occurs in that the display quality is degraded.

The present invention was made to solve the problem described above, and an object of the present invention is to provide a color filter substrate which has high display quality obtained by superior shading properties at the periphery of a display screen; an electrooptic device and an electronic apparatus; and methods for manufacturing a color filter substrate and an electrooptic device.

SUMMARY OF THE INVENTION

To these ends, a color filter substrate of the present invention comprises: a substrate comprising a pixel region and a first region surrounding the pixel region on a first surface of the substrate; a plurality of color layers disposed on the first surface of the substrate in the pixel region; and a color layer which is disposed in the first region and which is composed of the same material as that for one color layer of said plurality of color layers disposed on the first surface of the substrate.

According to this structure, since the color layer disposed in the first region is composed of the same layer as that for one of the color layers disposed in the pixel region, a step is not formed by the difference in thickness of the film in the vicinity of the boundary between the pixel region and the first region. Accordingly, in the vicinity of the boundary between the pixel region and the first region, the film formed on the color filter substrate is continuous, and the change in thickness thereof is decreased. Hence, when the color filter substrate formed as described above is incorporated in an electrooptic device, the change in cell gap in the vicinity of the boundary between the pixel region and the first region can be reduced, and as a result, degradation of display quality, which is caused by orientation defect of liquid crystal used as an electrooptic material, can be prevented.

In addition, the substrate may further comprise a second region surrounding the first region, and the color filter substrate may further comprise a laminate film which is disposed in the second region and which is formed of the same materials as those for at least two color layers of said plurality of color layers disposed on the first surface of the substrate.

According to this structure, since the laminate film composed of the color layers is formed in the second region surrounding the first region, this portion serves as a shading region. Accordingly, when the color filter substrate as described above is incorporated in an electrooptic device, the contrast of the pixel region can be enhanced, and as a result, a liquid crystal device having high display quality can be obtained.

The height of the laminate film disposed in the second region from the first surface may be lower than that of said plurality of color layers in the pixel region from the first substrate.

According to this structure, when the color filter substrate formed as described above is bonded to a counter substrate to form an electrooptic device, a holding material such as spacers, which hold the distance between the two substrates, may not move, and the distance between the substrates can be held constant, so that the display quality of the electrooptic device may not be degraded.

In addition, the color filter substrate may further comprise a reflective film disposed in the pixel region.

According to this structure, this color filter substrate may be used as a color filter substrate for an electrooptic device, such as a reflective liquid crystal device or a transflective liquid crystal device, which performs display using outside light.

In addition, the color filter substrate may further comprise a light scattering resin layer disposed in the pixel region, wherein the reflective film is provided on the light scattering resin layer.

As described above, the structure in which the reflective film is formed on the light scattering resin layer may be used. In this case, for example, irregularities are provided on the surface of the light scattering resin layer, and the reflective film is formed in conformity with the irregularities mentioned above, thereby forming irregularities on the surface of the reflective film. As a result, outside light is reflected from this reflective film and is then scattered, thereby increasing the brightness of the reflected light.

The color filter substrate described above may further comprise a plurality of pixels in the pixel region, and the pixels each have reflective regions in which the reflective film is disposed and non-reflective regions in which the reflective film is not disposed.

According to the structure described above, when the non-reflective regions, in other words, transmissive regions, are formed in the reflective film, the color filter substrate described above may be used as a color filter substrate for a transflective liquid crystal device that is an electrooptic device capable of performing transmissive and reflective displays. In the present invention, the pixel means a unit forming a display screen of an electrooptic device and corresponds to one unit composed of three dots in embodiments described later.

Each of the reflective regions may be disposed so as to surround the corresponding non-reflective region. As described above, both the reflective regions and the non-reflective regions may be likewise disposed.

In addition, the thicknesses of the color layers disposed in the reflective regions are different from those of the color layers disposed in the non-reflective regions.

As described above, when the color filter substrate in which the thicknesses of the color layers disposed in the reflective regions are different from those of the color layers disposed in the transmissive regions is incorporated in an electrooptic device, the same color display quality can be obtained in both transmissive and reflective display.

In addition, the color layer disposed in the first region is preferably composed of the same material as one color layer of the color layers disposed in the reflective region.

According to the structure described above, a step formed by the difference in thickness of the color layer may not be generated in the vicinity of the boundary between the pixel region and the first peripheral region. That is, since the structure is formed so that color layers disposed in the reflective regions are each formed so as to surround a corresponding color layer disposed in the non-reflective region, when the entire pixel region is observed, the color layers disposed in the reflective regions are disposed at the periphery of the pixel region. Accordingly, when the color layer in the first region is formed of the same material and by the same step as those for the color layers disposed in the reflective regions, the step formed by the difference in thickness of the color layer may not be generated in the vicinity of the boundary between the pixel region and the first region. Hence, when the color filter substrate as described above is incorporated in an electrooptic device, the change in cell gap in the vicinity of the boundary between the pixel region and the first peripheral region can be reduced, and hence degradation of display quality caused by orientation defect of liquid crystal can be prevented.

In addition, the laminate film disposed in the second region may be composed of the same materials as those for at least two color layers of said color layers disposed in the non-reflective regions.

According to this structure, since the color layers disposed in the non-reflective regions have high shading properties compared to those disposed in the reflective regions, a laminate film having higher shading properties can be obtained.

In addition, the color layer disposed in the first region is preferably blue in color.

As described above, blue may be used for the color layer. In general, as the color layers, three primary colors, that is, blue, green, and red, are used, and among those colors, blue has the highest shading properties. Accordingly, by using blue for the color layer disposed in the first region, a shading function can be obtained.

An electrooptic device of the present invention comprises the color filter substrate described above, a counter substrate disposed to oppose the color filter substrate, and an electrooptic material provided between the color filter substrate and the counter substrate.

According to the structure of the present invention, the change in cell gap in the vicinity of the boundary between the pixel region and the first region can be reduced, and degradation of display quality caused by orientation defect of liquid crystal used as an electrooptic material can be prevented, thereby forming an electrooptic device having high display quality.

In addition, the electrooptic device described above may further comprise a metal film on the counter substrate so as to correspond to the first region of the color filter substrate. According to this structure, the shading function in the first region can be further enhanced, and the contrast of the pixel region is also enhanced, thereby forming an electrooptic device having higher display quality.

In addition, the metal film may comprise tantalum. As described above, as the metal film, a film containing tantalum, such as a tantalum film, a tantalum alloy film, or a tantalum oxide film, may be used. In addition, the electrooptic device described above may further comprise a backlight which emits light to the color filter substrate and the counter substrate with the electrooptic material provided therebetween. As described above, transmissive display may be performed by the backlight thus disposed.

In addition, the electrooptic material may comprise liquid crystal. As described above, as the electrooptic material, liquid crystal may be used. An electronic apparatus of the present invention comprises the electrooptic device described above. Accordingly, the electrooptic devices described above may be applied to various electronic apparatuses.

A method of the present invention for manufacturing a color filter substrate is a method for manufacturing a color filter substrate having a substrate which comprises a pixel region and a first region surrounding the pixel region on a first surface of the substrate. The method described above comprises a step of forming first color layers on the first surface of the substrate in the first region and a part of the pixel region; and a step of forming second color layer on the first surface of the substrate in the pixel region except at least said part of the pixel region.

According to the structure of the present invention, since the color layer in the first region is formed of the same material and by the same step as those for the color layers disposed in the pixel region, an additional step of forming the color layer in the first region is not necessary, and in the color filter substrate manufactured by the method described above, a step is not formed by the difference in thickness of the film in the vicinity of the boundary between the pixel region and the first region. Accordingly, in the vicinity of the boundary between the pixel region and the first region, the film formed on the color filter substrate is continuous, and the change in thickness is decreased. Hence, when the color filter substrate as described above is incorporated in an electrooptic device, the change in cell gap in the vicinity of the boundary between the pixel region and the first region can be reduced, and as a result, degradation of display quality, which is caused by orientation defect of liquid crystal used as an electrooptic material, can be prevented.

In addition, the substrate may further comprise a second region surrounding the first region, and the steps of forming the first color layer and the second color layer may form a first color layer and a second color layer, respectively, in the second region so that a laminate film is formed on the first surface of the substrate.

According to the structure described above, since the color layers in the second region are each formed of the same material and by the same step as those for the corresponding color layer disposed in the pixel region, additional steps of forming the color layers in the second region are not necessary, and in the color filter substrate manufactured by the method described above, the second region serves as a shading region. Hence, when the color filter substrate as described above is incorporated in an electrooptic device, the contrast in the pixel region can be enhanced, and a liquid crystal device having high display quality can be obtained.

In addition, the substrate may further comprise a second region surrounding the first region, and the method described above may further comprise a step of forming third color layers on the first surface of the substrate in the pixel region at which the first color layers and the second color layers are not formed, wherein the steps of forming the first color layers, the second color layers, and the third color layers form a first color layer, a second color layer, and a third color layer, respectively, in the second region so that a laminate film is formed on the first surface of the substrate.

According to the structure described above, the laminate film may be formed by the same steps as those for the color layers in the pixel region, and hence a laminate film having a shading function can be formed without increase in the number of manufacturing steps. In addition, the height of the laminate film in the second region from the first surface is preferably lower than the color layers in the pixel region from the first surface.

When the color filter substrate thus formed is bonded to a counter substrate with a predetermined gap therebetween to form an electrooptic device, a holding material such as spacers which hold the distance between the two substrates may not move, and the distance between the substrates can be held constant, so that the display quality of the electrooptic device is not degraded.

In addition, the method described above may further comprise a step of forming a reflective film on the first surface of the substrate in the pixel region, wherein after the step of forming of the reflective film, the color layers are formed.

The color filter substrate thus formed may be used as a color filter substrate for an electrooptic device performing display using outside light, such as a reflective liquid crystal device or a transflective liquid crystal device. In addition, the method described above may further comprise a step of forming a light scattering resin layer on the first surface of the substrate in the pixel region, wherein after the step of forming the light scattering resin layer, the reflective film is formed.

As described above, a color filter substrate may also be used having the reflective film formed on the light scattering resin layer. In this case, for example, irregularities are formed on the surface of the light scattering resin layer, and the reflective film is formed in conformity with the irregularities mentioned above, thereby forming irregularities on the surface of the reflective film. As a result, outside light is reflected from the reflective film and is then scattered, thereby increasing the brightness of the reflected light.

In addition, the first color layers are preferably blue in color. As described above, blue may be used for the first color layers. In general, as the color layers, three primary colors, blue, green, and red, are used, and among those colors, blue has the highest shading properties. Accordingly, by using blue for the color layer disposed in the first region, a shading function can be obtained.

In addition, the second color layers are preferably red in color. As described above, red may be used for the second color layer. In general, as the color layers, three primary colors, blue, green, and red, are used, and in terms of the shading properties, red is second best to blue. Accordingly, when a two-layered laminate film is formed in the second region, blue and red, having higher shading properties among the three color layers, are preferably used for the color layers, and hence a more effective shading function can be obtained thereby.

Another method for manufacturing a color filter substrate is a method for manufacturing a color filter substrate having a substrate which comprises a pixel region, in which pixels each having reflective regions and non-reflective regions are disposed, and a first region surrounding the pixel region on a first surface of the substrate. The method described above comprises a step of forming first reflective color layers on the first surface of the substrate in the first region and some of the reflective regions; a step of forming second reflective color layers on the first surface of the substrate in the reflective regions except at least said some of the reflective regions; a step of forming first non-reflective color layers on the first surface of the substrate in said some of the non-reflective regions; and a step of forming second non-reflective color layers on the first surface of the substrate in the non-reflective regions except at least said some of the non-reflective regions.

According to the structure of the present invention, since the color layer in the first region is formed of the same material and by the same step as those for the color layers disposed in the pixel region, an additional step of forming the color layer in the first region is not necessary. In addition, the color filter substrate manufactured by the method as described above may be used for a transflective liquid crystal device. In the case described above, when the thickness of the non-reflective color layer used for transmissive display and the thickness of the reflective color layer used for reflective display are different from each other, and in addition, when the reflective color layer is disposed so as to surround the non-reflective color layer, a step is not formed by the difference in thickness of color layer in the vicinity of the boundary between the pixel region and the first peripheral region. That is, when the overall pixel region is observed, since the reflective color layer is disposed at the periphery of the pixel region, by providing the color layer in the first region which is formed of the same material and by the same step as those of the reflective color layers described above, a step is not formed by the difference in thickness of the color layer in the vicinity of the boundary between the pixel region and the first peripheral region. Hence, when the color filter substrate as described above is incorporated in an electrooptic device, the change in cell gap in the vicinity of the boundary between the pixel region and the first region can be reduced, and as a result, degradation of display quality, which is caused by orientation defect of liquid crystal, can be prevented.

In addition, the substrate may further comprise a second region surrounding the first region, and the steps of forming the first non-reflective color layers and the second non-reflective color layers may form a first non-reflective color layer and a second non-reflective color layer, respectively, in the second region so that a laminate film is formed on the first surface of the substrate.

According to the structure described above, the laminate film can be formed by the same steps as those for the color layers in the pixel region, and hence a laminate having a shading function can be formed without increase in the number of manufacturing steps.

In addition, the substrate may further comprise a second region surrounding the first region, and the method described above may further comprise a step of forming third reflective color layers on the first surface of the substrate in the reflective regions at which the first reflective color layers and the second reflective color layers are not formed, and a step of forming third non-reflective color layers on the first surface of the substrate in the non-reflective regions at which the first non-reflective color layers and the second non-reflective color layers are not formed, wherein the steps of forming the first non-reflective color layers, the second non-reflective color layers, and the third non-reflective color layers form a first non-reflective color layer, a second non-reflective color layer, and a third non-reflective color layer in the second region so that a laminate is formed on the first surface of the substrate film.

According to the structure described above, a three-layered laminate film can be formed by the same steps of forming the color layers in the pixel region, and without increase in the number of manufacturing steps, a laminate film having a shading function can be formed.

In addition, the reflective regions are each formed so as to surround the corresponding non-reflective region, and the method described above may further comprise a step of forming a reflective film on the first surface of the substrate in the reflective regions, wherein after the step of forming the reflective film, the color layers are formed.

As described above, as a reflection mechanism, the reflective film may be formed. The method described above may further comprise a step of forming a light scattering resin layer on the first surface of the substrate in the pixel region, wherein after the step of forming the light scattering resin layer, the reflective film is formed.

As described above, the light scattering resin layer may be formed. The thicknesses of the reflective color layers disposed in the reflective regions are preferably different from those of the non-reflective color layers disposed in the non-reflective regions.

As described above, when the color filter substrate in which the thicknesses of the color layers disposed in the reflective regions are different from those of the color layers disposed in the non-reflective regions, that is, the transmissive regions, is incorporated in an electrooptic device, the same color display quality can be obtained in both transmissive and reflective displays.

In addition, the first reflective color layers are preferably blue in color. Blue may be used for the first color layer, and hence the color layer formed in the first region is blue. In general, as the color layers, three primary colors, blue, green, and red, are used, and among those colors, blue has the highest shading properties. Accordingly, by using blue for the color layer disposed in the first region, a shading function can be obtained.

A method of the present invention for manufacturing an electrooptic device is a method for manufacturing an electrooptic device comprising an electrooptic material provided between a color filter substrate and a counter substrate, and in the method described above, the color filter substrate is manufactured in accordance with the methods for manufacturing the color filter substrates described above.

According to the structure of the present invention described above, an electrooptic device having high display quality can be obtained.

Figure 1:
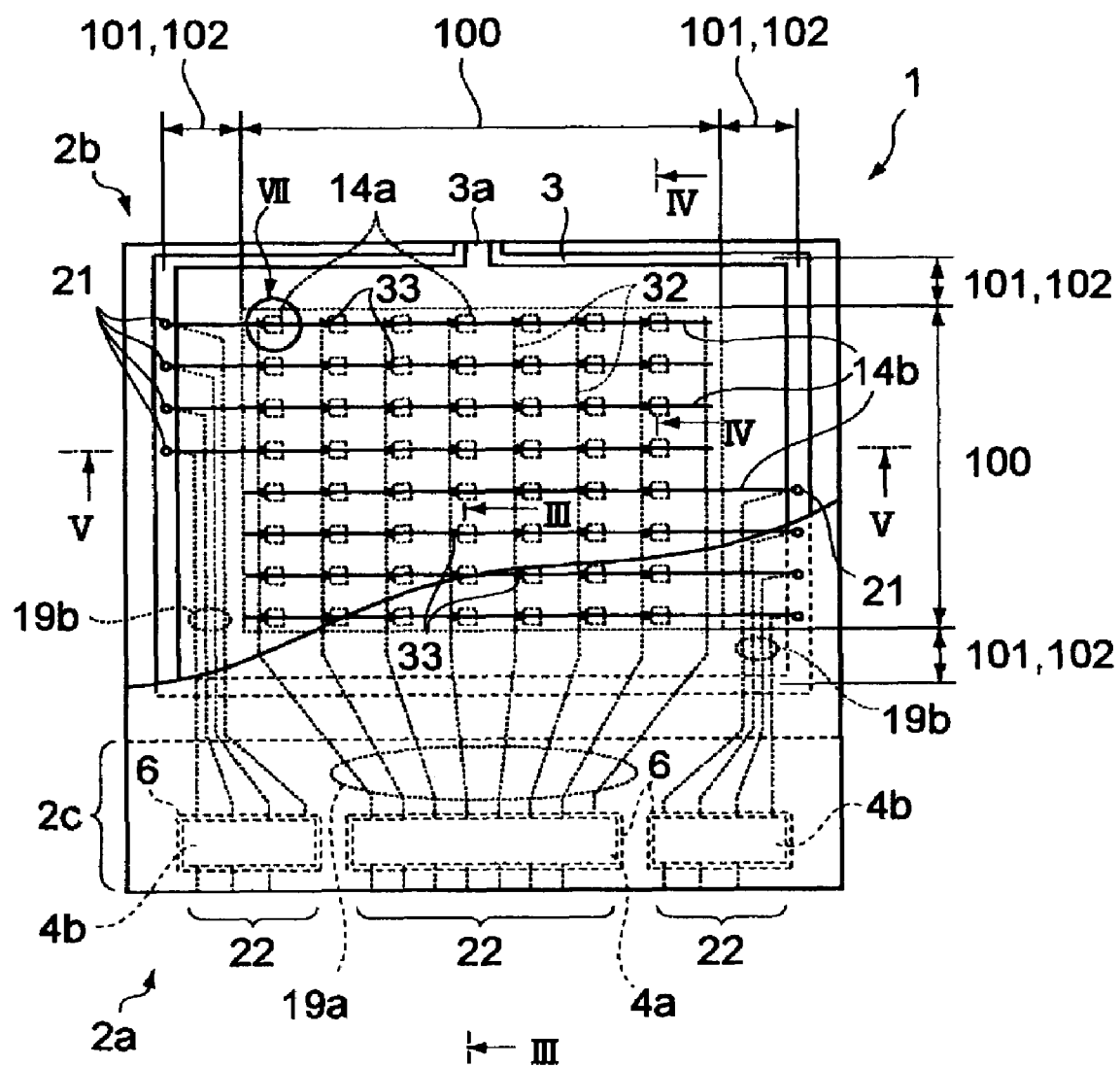
FIG. 1 is a partly exploded plan view of a liquid crystal device of a first embodiment according to the present invention.

DESCRIPTION OF THE PREFERRED EMBODIMENTS (First Embodiment)

Hereinafter, the present invention will be described with reference to drawings about the case in which the present invention is applied to an active matrix transflective liquid crystal device of the COG-type using TFD elements as switching elements, which is an example of an electrooptic device. In the drawings, in order to easily recognize individual constituent elements, the reduction scales, the number of elements, and the like are differ from those of the actual structure.

Figure 2:
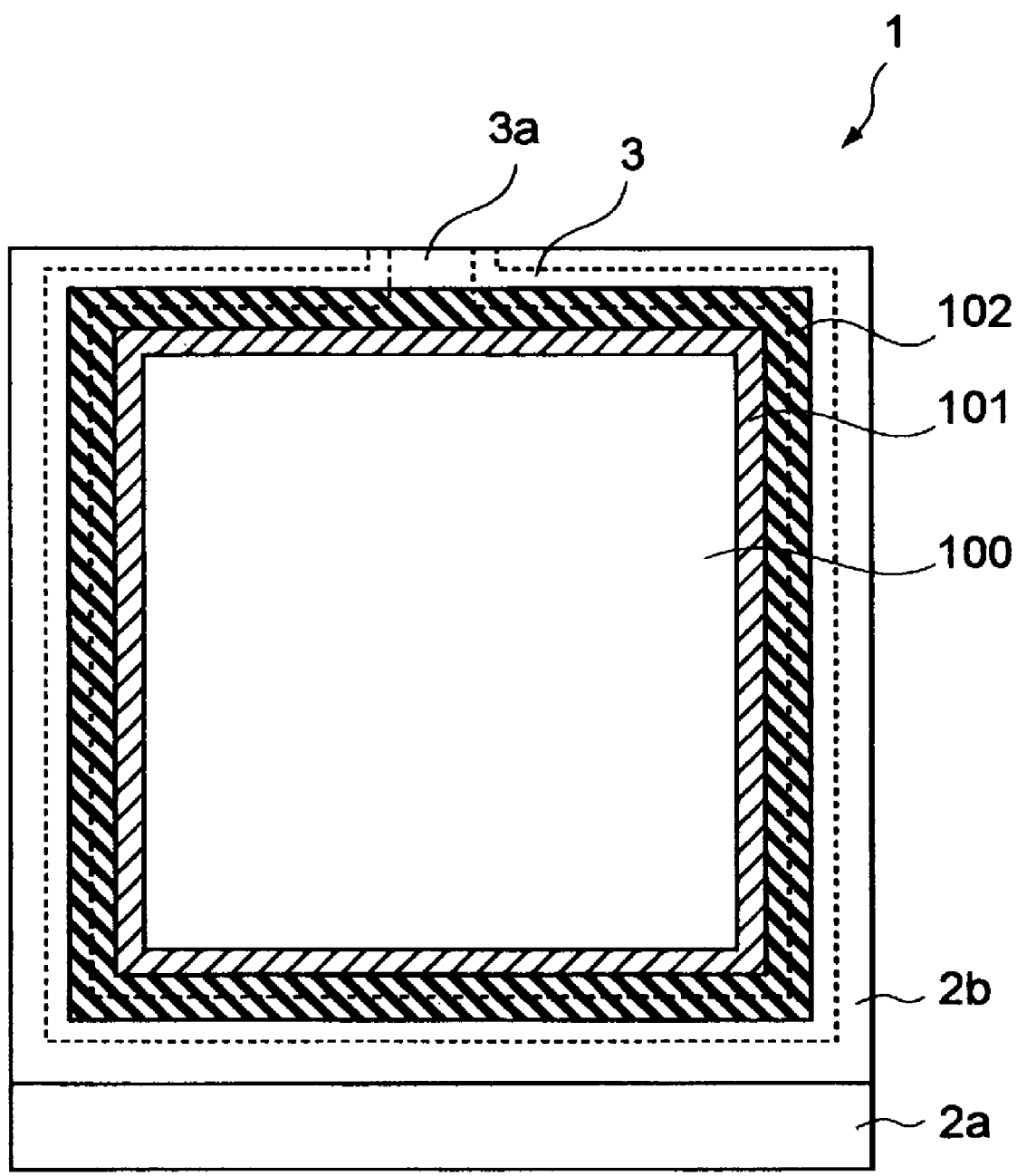
FIG. 2 is a plan view for illustrating the positional relationship among a pixel region, a first peripheral region, and a second peripheral region of the liquid crystal device shown in FIG. 1.

FIG. 1 is a plan view showing a liquid crystal device according to an embodiment, and FIG. 2 is a plan view for illustrating the positional relationship among a pixel region, a first peripheral region, and a second peripheral region of the liquid crystal device shown in FIG. 1.

A liquid crystal device 1 shown in FIG. 1 is formed by bonding, that is, adhering, a counter substrate 2a disposed at the front side of this figure to a color filter substrate 2b disposed at the rear side of this figure with a sealing material.

A region surrounded by a sealing material 3, the counter substrate 2a, and the color filter substrate 2b forms a gap having a predetermined height, in other words, a so-called cell gap is formed. In addition, a liquid crystal inlet 3a is formed in a part of the sealing material 3. Into the cell gap described above, liquid crystal is injected via the liquid crystal inlet 3a, and after the injection is performed, the liquid crystal inlet 3a is sealed with a resin or the like.

As shown in FIG. 1, the counter substrate 2a has a substrate protruding portion 2c which protrudes outside from the color filter substrate 2b, and on this substrate protruding portion 2c, liquid crystal drive ICs 4a and 4b are mounted with a conductive adhesive such as an ACF (Anisotropic Conductive Film) 6. The liquid crystal drive ICs 4a and 4b have different properties from each other, and the reason the two different types of liquid crystal drive ICs are used is that one type IC cannot control operation of both the counter substrate 2a and the color filter substrate 2b since voltages used for scanning lines drive system and signal line drive system are different from each other.

The structure of each substrate will be described later in detail; however, as shown in FIGS. 1 and 2, the liquid crystal device 1 has a pixel region 100 having a size approximately equivalent to that of a display screen, a first peripheral region 101 surrounding this pixel region 100, and a second peripheral region 102 further surrounding this first peripheral region 101. Both the first and the second peripheral regions serve as a shading region. The second peripheral region 102 is disposed so that the outer edge portion thereof overlaps the inner edge portion of the sealing material 3.

Figure 3:
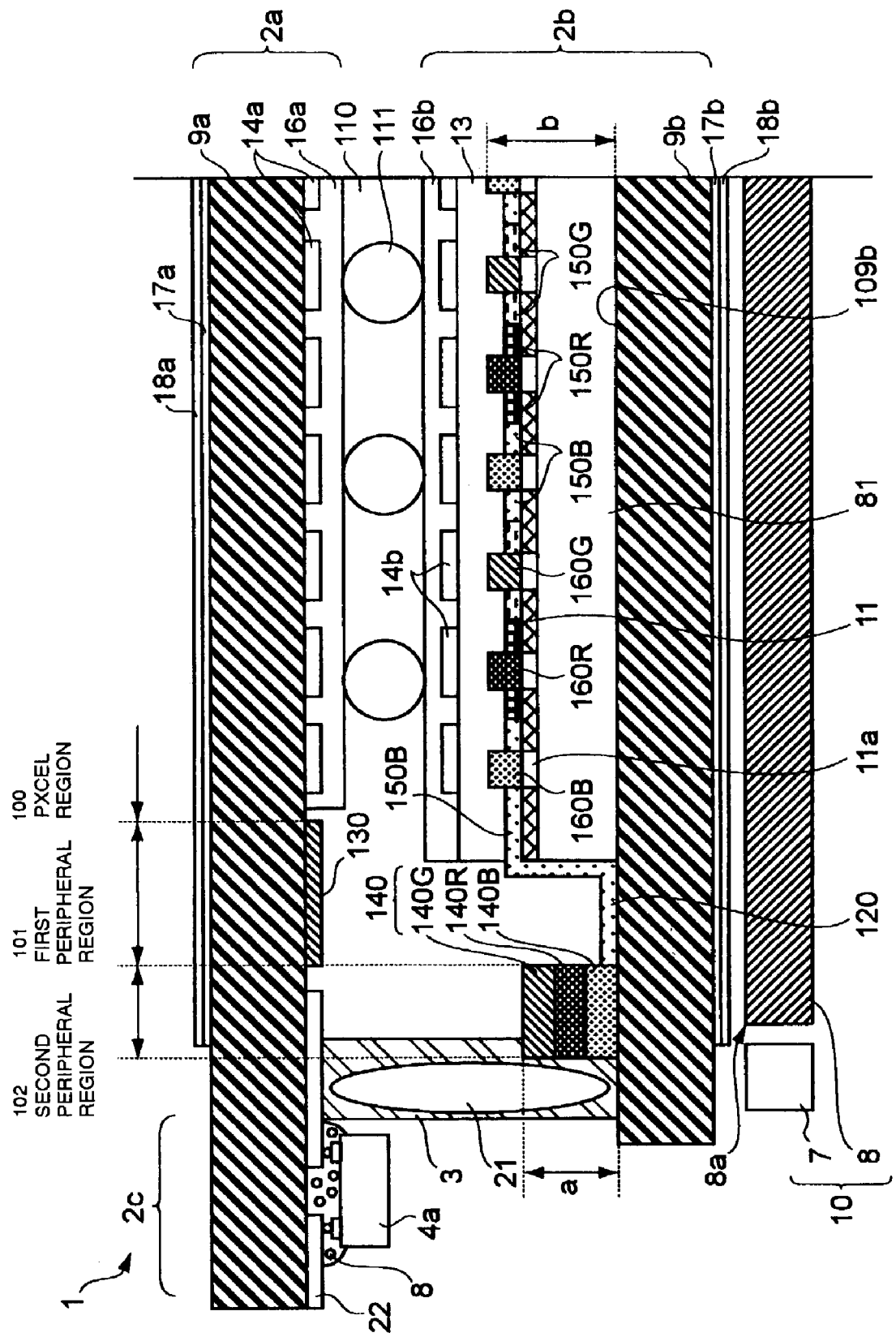
FIG. 3 is a partial cross-sectional view showing the structure of the liquid crystal device taken along the line III—III in FIG. 1.
Figure 4:
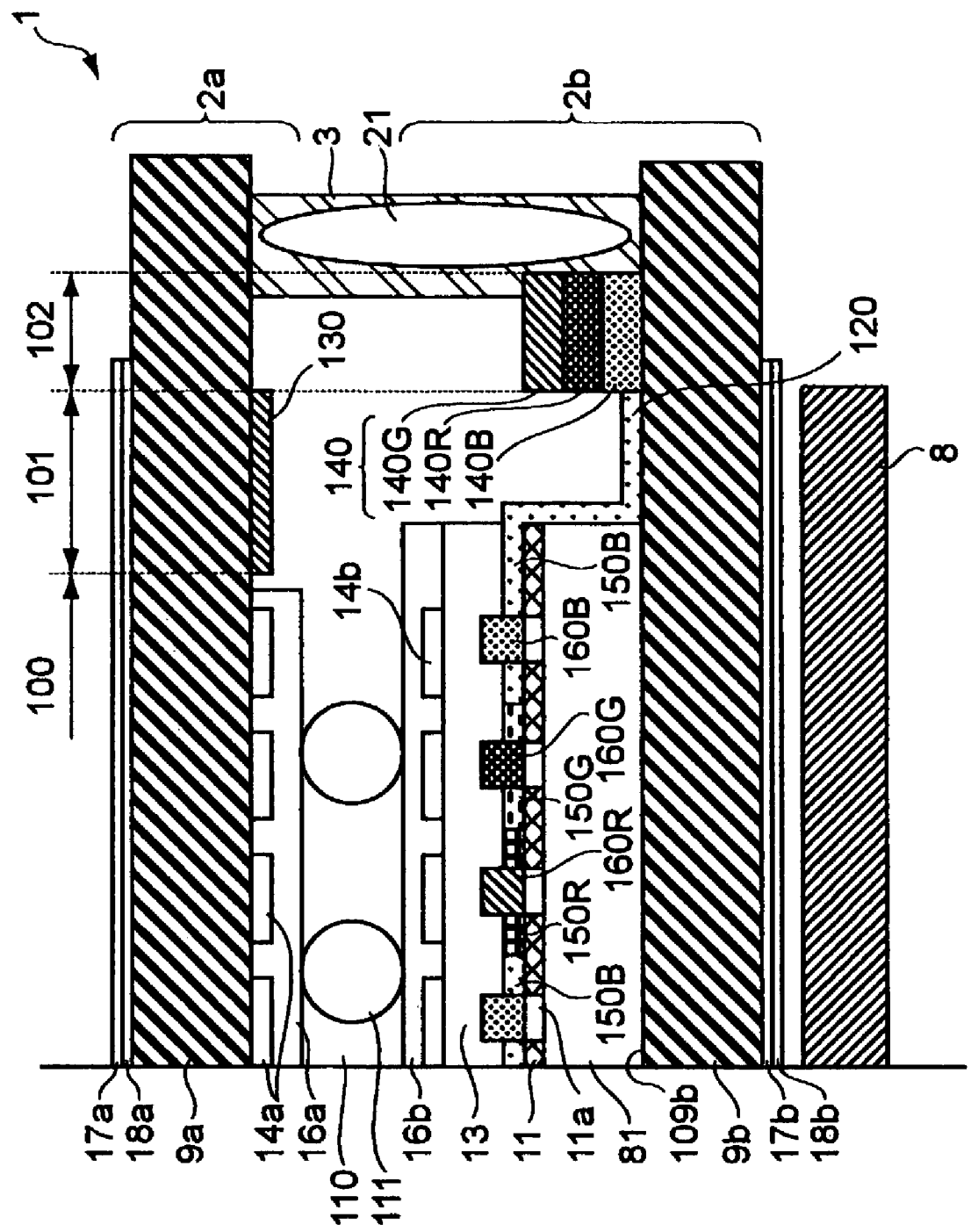
FIG. 4 is a partial cross-sectional view showing the structure of the liquid crystal device taken along the line IV—IV in FIG. 1.

FIG. 3 is a partial cross-sectional view of the liquid crystal device structure taken along the line III—III in FIG. 1. FIG. 4 is a partial cross-sectional view of the liquid crystal device structure taken along the line IV—IV in FIG. 1. The liquid crystal device 1 is formed of liquid crystal 110, functioning as an electrooptic material, provided between the counter substrate 2a and the color filter substrate 2b. The distance between the counter substrate 2a and the color filter substrate 2b is fixed by spacers 111. In addition, at the rear side (lower side of the structure shown in FIGS. 3 and 4) of the color filter substrate 2b, a lighting device 10 having a light source 7 and a light guide 8 is provided as a backlight.

As shown in FIGS. 3 and 4, the counter substrate 2a has a substrate 9a, and on the surface of the substrate 9a, that is, on the surface at the liquid crystal 110 side, a plurality of pixel electrodes 14a are disposed. In addition, as shown in FIG. 1, on the internal surface of the counter substrate 2a, a plurality of linear line wires 32 are disposed parallel to each other so as to form a stripe pattern, TFD elements 33 are formed so as to be connected to these line wires 32, and the plurality of pixel electrodes 14a are disposed in a matrix via these TFD elements 33. In addition, on the pixel electrodes 14a, the TFD elements 33, and the line wires 32, as shown in FIGS. 3 and 4, an alignment film 16a is disposed. In addition, a retardation film 17a is disposed on the external surface of the substrate 9a, and a polarizer 18a is further disposed on the retardation film 17a.

Figure 7:
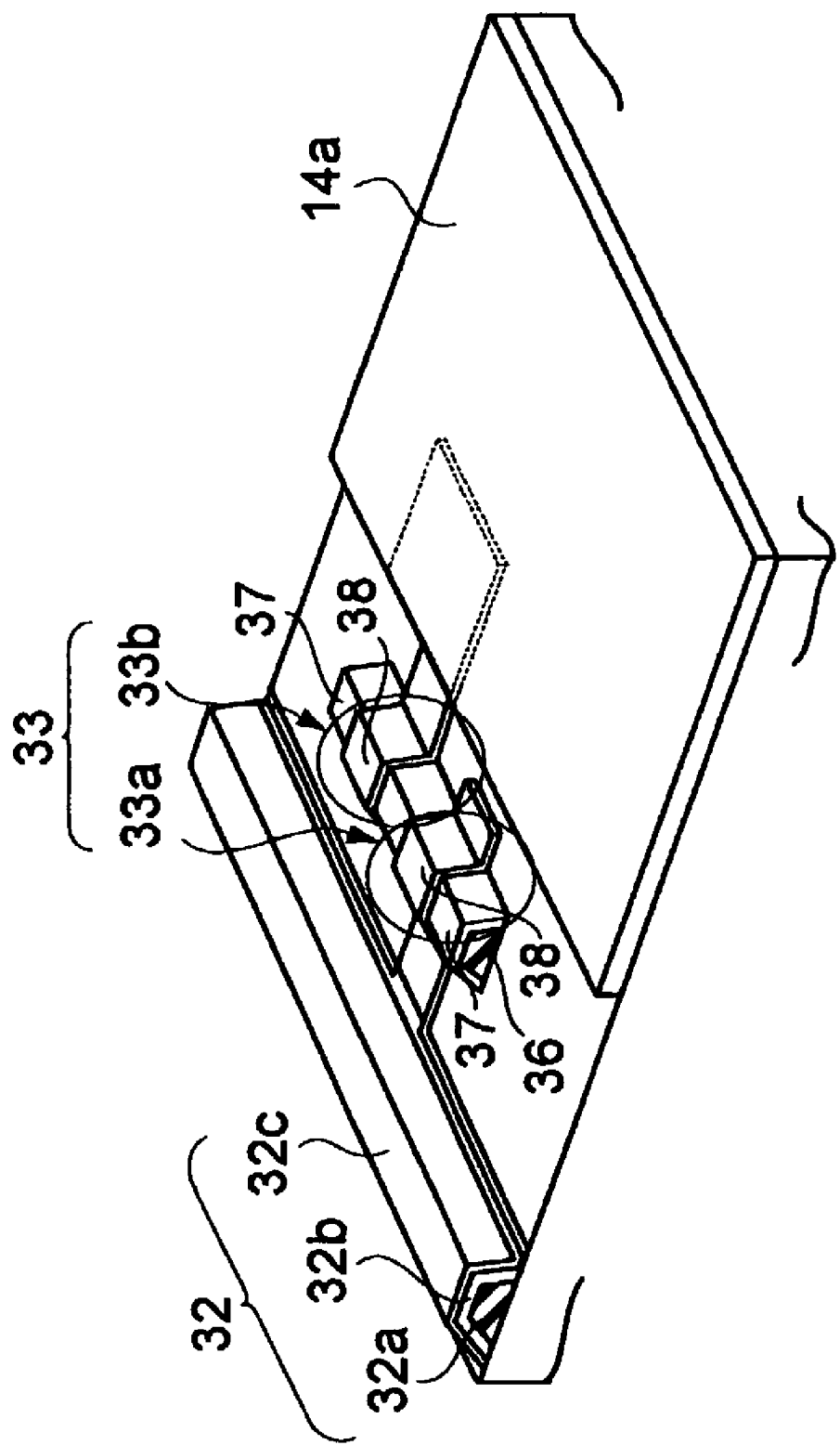
FIG. 7 is an enlarged perspective view showing a TFD element indicated by the arrow VII in FIG. 1.

The structure of one TFD element and the vicinity thereof indicated by the arrow VII in FIG. 1 is shown in FIG. 7 by way of example. A TFD element shown in FIG. 7 has a so-called back-to-back structure. As shown in FIG. 7, the line wire 32 has a three-layered structure formed of a first layer 32a made of TaW (tantalum tungsten) or the like, a second layer 32b made of an anodized $Ta_2O_5$ (tantalum oxide) film or the like, and a third layer 32c made of Cr or the like.

In addition, the TFD element 33 is formed by connecting a first TFD portion 33a and a second TFD portion 33b in series. The first TFD portion 33a and the second TFD portion 33b are each have a three-layered structure formed of a first metal layer 36 made of TaW, an insulating layer 37 made of $Ta_2O_5$ by anodization, and a second metal layer 38 made of Cr, which is formed of the same layer as that for the third layer 32c of the line wire 32.

The first TFD portion 33a has a laminate structure in which current from the line wire 32 side flows through the second metal layer 38, the insulating layer 37, and the first metal layer 36 in that order. On the other hand, the second TFD portion 33b has a laminate structure in which current from the line wire 32 side flows through the first metal layer 36, the insulating layer 37, and the second metal layer 38 in that order. As described above, by connecting the pair of the TFD portions 33a and 33b to each other in series so that the electrical directions thereof are opposite to each other, a TFD element having the back-to-back structure is formed, and hence stability of switching properties of the TFD element can be obtained. The pixel electrode 14a is formed, for example, of ITO so as to be electrically connected to the second metal layer 38 of the second TFD portion 33b.

In addition, on the counter substrate 2a, a picture-frame shaped metal film 130 is formed to oppose the first peripheral region 101. This metal film 130 may have a laminate structure formed, for example, of the first layer 32a made of TaW (tantalum tungsten) and the second layer 32b made of an anodized $Ta_2O_5$ (tantalum oxide) film of the line wire 32, and the metal film 130 may be formed in the same steps as those for forming the TFD element. In addition, as the metal film 130, a single layer may be used which is made of a TaW (tantalum tungsten) layer formed in the same step as that for the first layer 32a forming the TFD element.

As shown in FIGS. 3 and 4, the color filter substrate 2b has a substrate 9b having a first surface 109b. On the first surface 109b of the substrate 9b, that is, on the surface at the liquid crystal 110 side, a light scattering resin layer 81, having a thickness of 1.4 to 2.6 μm and being formed, for example, of an acrylic or epoxy resin, is disposed, and on this light scattering resin layer 81, a reflective film 11 having a thickness of 160 to 260 nm and being formed of a material having a light reflective property, such as Al, is further disposed. Although not shown in the figure, the light scattering resin layer 81 has an irregular or roughened surface at the side to be brought into contact with the reflective film 11, and the reflective film 11 is formed in conformity with this irregularities, thereby forming irregularities on the surface of the reflective film 11. In addition, the reflective film 11 has an opening 11*a* in each dot, which allows light to pass therethrough. That is, when display is performed in accordance with the function of a reflective liquid crystal device using outside light, outside light incident on the liquid crystal device 1 is reflected from the reflective film 11, and display is performed using this reflected light, and when display is performed in accordance with the function of a transmissive liquid crystal device using a backlight 10, light emitted from the backlight 10 passes through the openings 11*a* formed in the reflective film 11, so that display is performed. In this embodiment, the transflective function is obtained by forming the openings in parts of the reflective film 11; however, for example, when the reflective film is thinned so as to allow light to pass therethrough, the transflective function can also be obtained. In addition, in this embodiment, in order to efficiently scatter outside light, the reflective film 11 is formed on the light scattering resin layer 81 having irregularities on the surface thereof so as to form irregularities on the surface of the reflective film 11; however, without the light scattering resin layer 81, after irregularities are formed on the surface of the substrate 9*b* by frost treatment or the like, the reflective film 11 may be formed on the irregular region of the substrate 9*b* so as to form irregularities on the surface of the reflective film 11. Alternatively, without the light scattering resin layer 81, the structure may be formed in which the reflective film 11 is provided on a flat surface of the substrate 9*b* to form a flat surface of the reflective film 11, and a light scattering layer for light scattering is provided at the external surface side of the substrate 9*a*.

Furthermore, on the reflective film 11, a color filter film and an overcoat layer 13 having a thickness of 1.4 to 2.6 $\mu$m are disposed, second electrodes 14*b* are disposed on the overcoat layer, and an alignment film 16*b* is further disposed on those mentioned above. In addition, on the external surface of the substrate 9*b*, a retardation film 17*b* is formed, and on that film mentioned above, a polarizer 18*b* is further disposed.

As shown in FIG. 1, the second electrodes 14*b* are formed of a great number of linear electrodes disposed in parallel to each other in a stripe pattern so as to intersect the line wires 32. In FIG. 1, to facilitate understanding of the electrode pattern, the second electrodes 14*b* having exaggerated large spaces therebetween are shown schematically; however, in practice, the spaces between the second electrodes 14*b* are formed to be very small in accordance with dot pitches of the pixel electrodes 14*a*.

The intersections between the pixel electrodes 14*a* and the second electrodes 14*b* are arranged in a dot matrix, each intersection forms one dot, and each color layer pattern of the color filter film shown in FIGS. 3 and 4 corresponds to one dot described above.

In the color filter film described above, one unit is composed of three primary colors R (red), G (green), B (blue), and this unit forms one pixel. That is, three dots form one unit functioning as one pixel. The color filter film of this embodiment is formed of reflective blue color layers 150B as a first reflective color layer, reflective red color layers 150R as a second reflective color layer, reflective green color layers 150G as a third reflective color layer, non-reflective blue color layers 160B as a first non-reflective color layer, non-reflective red color layers 160R as a second non-reflective color layer, and non-reflective green color layers 160G as a third non-reflective color layer.

Figure 6:
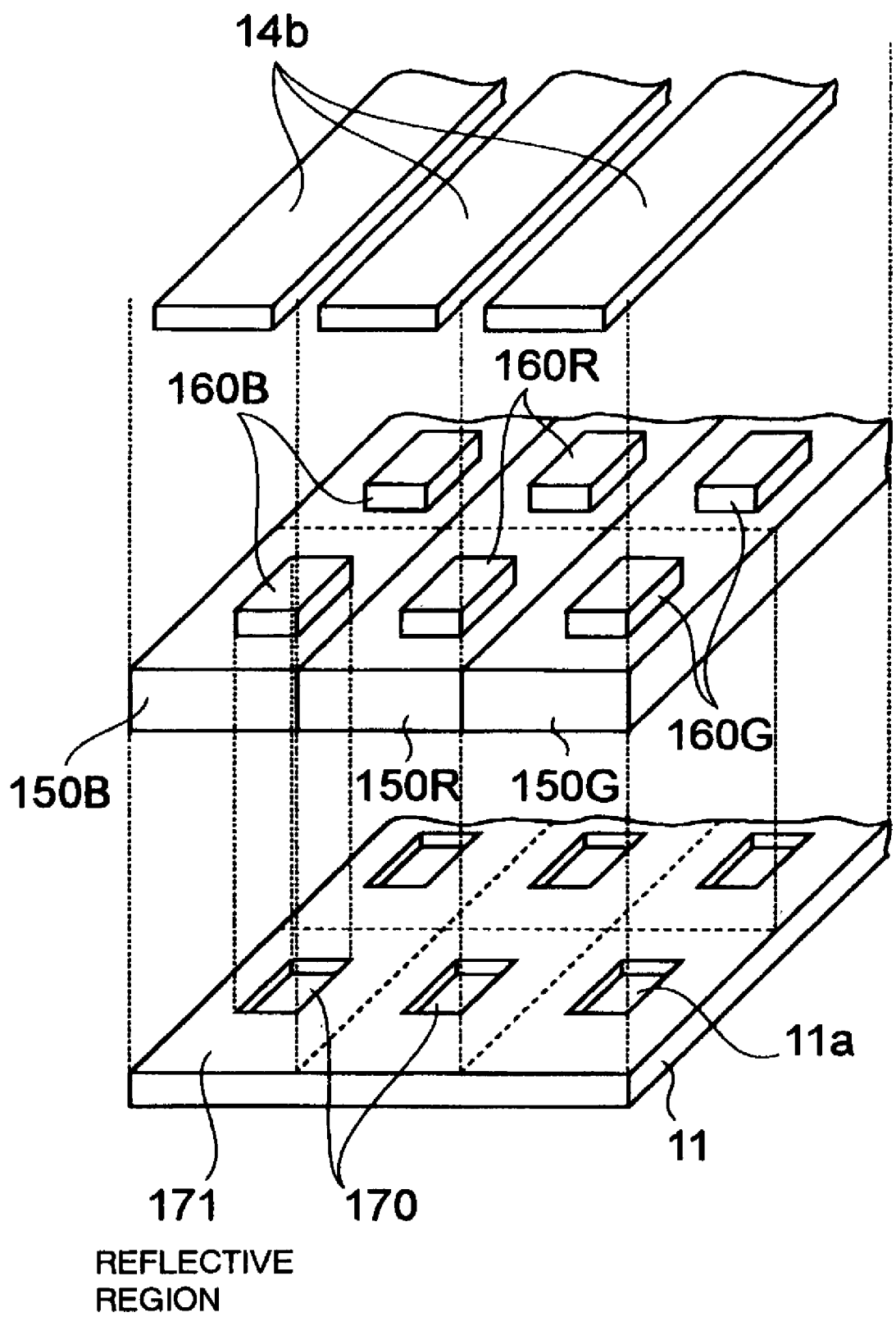
FIG. 6 is a schematic, perspective view for illustrating the positional relationship among a reflective film, color layers, and second electrodes of a color filter substrate of the liquid crystal device shown in FIG. 1.

Next, referring to FIGS. 3, 4, and 6, the positional relationship between the color filter film and the reflective film, and the structures thereof will be described. FIG. 6 is a schematic perspective view for illustrating the positional relationship among the reflective film 11, the color layers, and the second electrodes on the color filter substrate 2*b* of the liquid crystal device 1 shown in FIG. 1. As shown in the figure, the liquid crystal device 1 has the structure in which one opening 11*a* of the reflective film 11 is provided in each dot. A part of the reflective film 11, which corresponds to one dot, is formed in the reflection region 171 used for reflection display to surround the opening 11*a* located in a non-reflection region 170 used for transmission display. In addition, the reflective blue color layers 150B, reflective red color layers 150R, and reflective green color layers 150G are formed approximately along the second electrodes 14*b* so as to form a stripe pattern, and at positions corresponding to the openings 11*a* of the reflective film 11, the reflective color layers are not provided. In addition, the non-reflective blue color layers 160B, non-reflective red color layers 160R, and non-reflective green color layers 160G are formed at positions corresponding to the openings 11*a* and approximately along the second electrodes 14*b* so that the same color layers are disposed linearly. For the reflective color layers 150 and non-reflective color layers 160, in other words, transmissive color layers, coloring materials and the thicknesses thereof are different from each other. In particular, although an organic resin, such as an acrylic, epoxy, or polyimide resin, is used for both the reflective color layers 150 and the non-reflective color layers 160, amounts of pigment dispersed therein or the like are different from each other. In addition, in this embodiment, the reflective color layer 150 is formed to have a thickness of 1 $\mu$m, and on the other hand, the non-reflective color layer 160 is formed to have a thickness of 1.5 $\mu$m. In addition, among the reflective color layers 150 and the non-reflective color layers 160, each blue color layer has the highest shading property, and each red color layer is second best to the blue color layer in shading property. In the figure, the opening 11*a* formed in the reflective film 11 is shown as if a space is present therein; however, since the reflective film 11 has a significantly small thickness compared to that of the color layers 150 and 160, the openings 11*a* are filled with the color layers 160 in practice.

Figure 5:
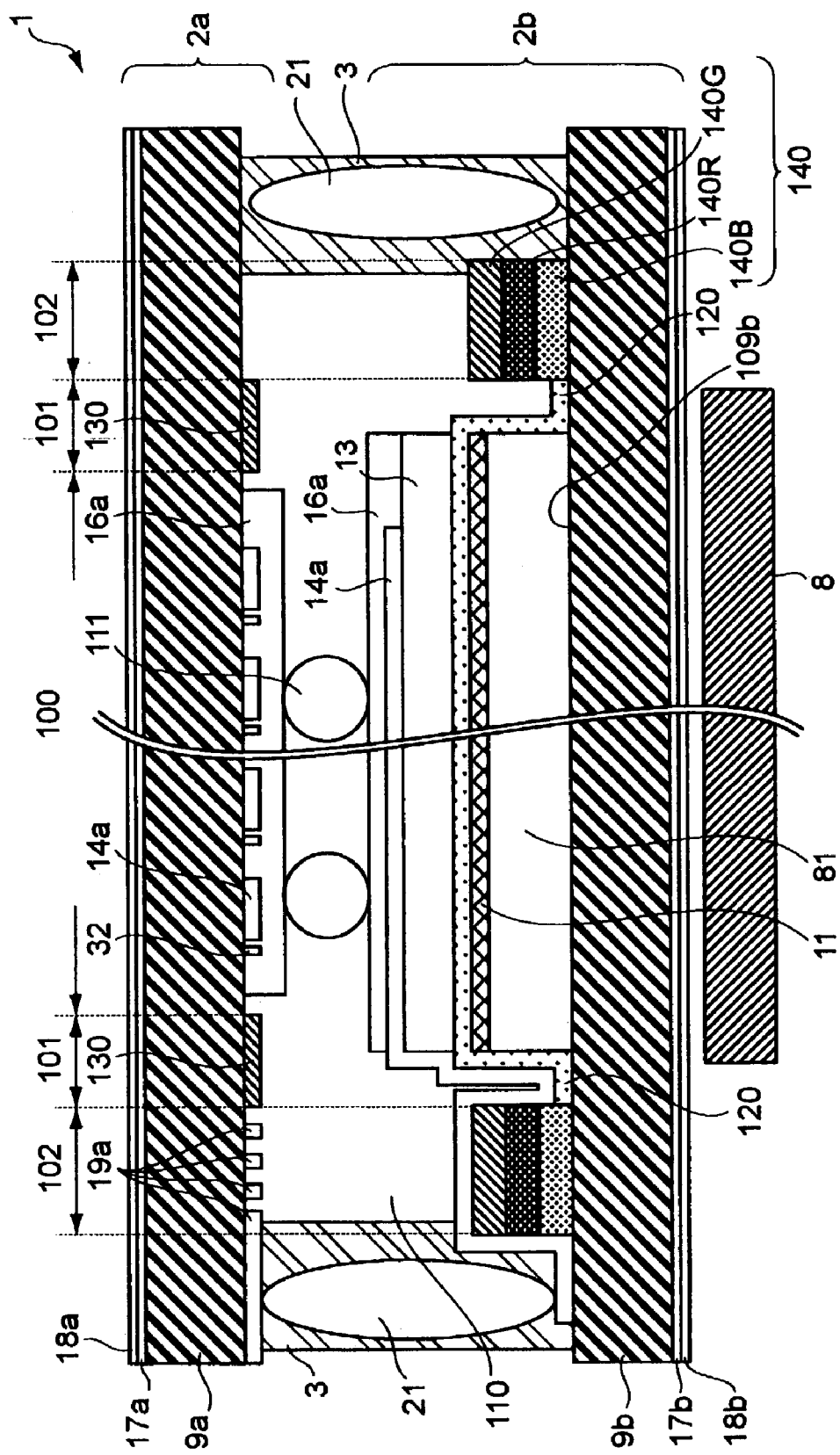
FIG. 5 is a partial cross-sectional view showing the structure of the liquid crystal device taken along the line V—V in FIG. 1.

In this embodiment, as shown in FIGS. 3, 4, and 5, FIG. 5 which is a cross-sectional view taken along the line V—V in FIG. 1, in the first peripheral region 101 of the color filter substrate 2*b*, as a first peripheral color layer, a first peripheral blue color layer 120 in a picture-frame shape is disposed which is formed of the same material and by the same step as those for the reflective blue color layer 150B disposed in the pixel region 100. Accordingly, the step of forming the color layer may be omitted in the vicinity of the boundary between the pixel region 100 and the first peripheral region 101. That is, in this embodiment, since the color layer in each dot is formed so that the reflective color layer 150 surrounds the non-reflective color layer 160, when the overall pixel region is observed, the reflective color layer 150 is disposed at the periphery of the pixel region. Accordingly, when the first peripheral color layer 120, which is formed of the same material and by the same step as those for this reflective color layer 150, is provided in the first peripheral region 101, the step of generating a difference in the thickness of the color layer may not be omitted in the vicinity of the boundary of the pixel region 100 and the first peripheral region 101. In addition, in this embodiment, the light scattering resin layer 81 and the reflective film 11 are formed so as to overlap at least the inner edge portion of the first peripheral region 101, and the overcoat layer 13 and the alignment film 16b are also formed so as to overlap at least the inner edge portion of the first peripheral region 101. Hence, in the vicinity of the boundary between the pixel region 100 and the first peripheral region 101, the film formed on the color filter substrate 2b becomes continuous, and hence the change in thickness is decreased. As a result, compared to traditional structures, the change in cell gap in the vicinity of the boundary between the pixel region 100 and the first peripheral region 101 can be reduced, and degradation of display quality caused by orientation defects of the liquid crystal material can be reduced.

In addition, in this embodiment, since the color layer is disposed in the first peripheral region 101, light leakage from the backlight can be shaded, and also in this embodiment, since blue color having high shading property is used as the first peripheral color layer, light leakage from the backlight can be efficiently shaded as compared to the case in which another color such as red or green is used. In this embodiment, blue color is used as the first peripheral color layer; however, red color or green color may be used, and preferably, blue color or red color having high shading property is used. Furthermore, as described above, since the metal film 130 is formed on the counter substrate 2a so as to correspond to the first peripheral region 101, light leakage from the backlight can be further shaded, and the contrast of the pixel region can be enhanced, thereby forming a liquid crystal device having high display quality.

In the second peripheral region 102 of the color filter substrate 2b, a picture-frame shaped laminate film 140 composed of three color layers having three different colors from each other, that is, a second peripheral blue color layer 140B, a second peripheral red color layer 140R, and a second peripheral green color layer 140G, is disposed, these three color layers being formed of the same materials and by the same steps as those for the non-reflective blue color layer 160B, non-reflective red color layer 160R, and non-reflective green color layer 160G, respectively, which are disposed in the pixel region 100. As described above, by further forming a shading film of the laminate film 140 in the second peripheral region 102 surrounding the first peripheral region 101, light leakage from the backlight can be further shaded, and hence a liquid crystal device having higher display quality can be obtained. Related to this, in this embodiment, the color layers having three different colors are used to form the laminate film 140; however, two color layers having different colors may be used, and in this case, a blue color layer and a red color layer are preferably formed for forming a laminate film in order of higher shading ability. In addition, height "a" of the laminate film 140 from the first surface 109b of the color filter substrate 2b is preferably smaller than height "b" of the color filter film from the first surface 109b of the color filter substrate 2b. The reason for this is that when height a is larger than height b, the spacers 111 move when the liquid crystal device 1 is formed, and as a result, the cell gap in the substrate surface may become nonuniform in some cases.

The substrates 9a and 9b described above are formed, for example, of glass or plastic. In addition, the electrodes 14a and 14b described above having a desired pattern may be formed by a known film-forming method, such as sputtering or vacuum deposition, using ITO (Indium Tin Oxide) or the like and a subsequent photolithographic method.

The alignment films 16a and 16b are formed, for example, by an offset printing method or a method in which a polyimide solution is applied and then baked.

As shown in FIG. 1, on the substrate protruding portion 2c of the counter substrate 2a, wires 19a are formed which are connected to the third layers 32c of the line wires 32, and wires 19b are also formed which are connected to the second electrodes 14b on the color filter substrate 2b via a conductive material 21 (see FIG. 5) dispersed in the sealing material 3. As the structure of the wire 19a, for example, a laminate structure may be used which is composed of a Cr (chromium) layer formed by the same step as that for the third layer 32c and an ITO (Indium Tin Oxide) layer formed by the same step as that for the second electrodes 14b. In addition, as the structure of the wire 19a, for example, a laminate structure may be used which is composed of a Cr (chromium) layer formed by the same step as that for the third layer 32c and one of a TaW (tantalum tungsten) layer formed by the same step as that for the first layer 32a of the TFD element, a $Ta_2O_5$ (tantalum oxide) layer formed by the same step as that for the second layer 32b of the TFD element, and an ITO (Indium Tin Oxide) layer formed by the same step as that for the second electrodes 14b. In addition, portions of the wire 19a and the second electrode 14b, which are connected to each other with the conductive material 21, serve as terminals.

In FIGS. 3 to 5, to facilitate understanding of the entire liquid crystal device 1, the conductive material 21 having an oval cross-sectional shape is schematically shown; however, in practice, the conductive material 21 are formed into spherical or cylindrical shape, and the size thereof is very small as compared to the line width of the sealing material 3. Accordingly, a plurality of small products formed from the conductive material 21 can be present in the line width direction of the sealing material 3.

The liquid crystal device 1 of this embodiment performs display in accordance with a transflective display system. In the case of reflective display performed by this transflective display system, light incident from outside of the counter substrate 2a side shown in FIGS. 3 to 5 is reflected from the reflective film 11 and is then supplied to the layer of the liquid crystal 110. In the state described above, when the orientation of liquid crystal in each pixel is controlled by controlling a voltage applied to the liquid crystal 110 for each pixel, the light supplied to the layer of the liquid crystal 110 is modulated in each pixel, and this modulated light is supplied to the polarizer 18a. Accordingly, images such as letters are displayed. On the other hand, in the case of transmissive display, light emitted from the backlight 10 shown in FIGS. 3 to 5 is supplied to the layer of the liquid crystal 110. In the state described above, when the orientation of liquid crystal in each pixel is controlled by controlling a voltage applied to the layer of the liquid crystal 110 for each pixel, the light supplied to the layer of the liquid crystal 110 is modulated in each pixel, and this modulated light is supplied to the polarizer 18a. Accordingly, images such as letters are displayed.

In this embodiment, the pixel region includes an effective display region performing display and a dummy pixel region disposed to surround this effective display region. In the dummy pixel region, a pattern having the same shape as that of the pixel electrodes in the effective display region is practically formed. However, the pattern formed in this region is not composed of a transparent electrode material such as ITO, and non-transparent metal films are provided on areas corresponding to the electrodes. Hence, the dummy pixel region functions as a shading region.

Next, a method for manufacturing the above liquid crystal device will be described.

Figure 8:
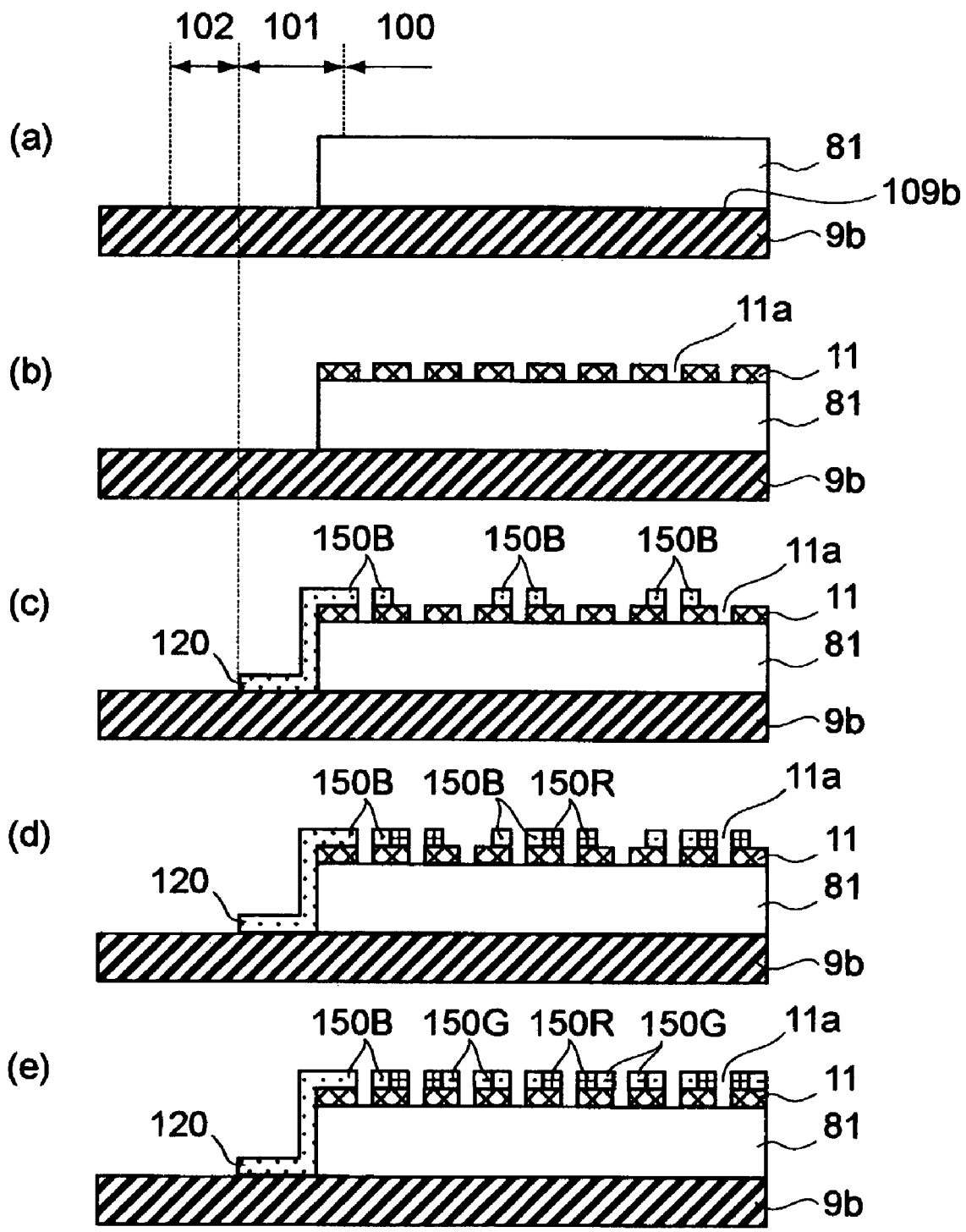
FIG. 8 includes partial cross-sectional views showing a manufacturing process (part 1) for a color filter substrate of the liquid crystal device shown in FIG. 1.
Figure 9:
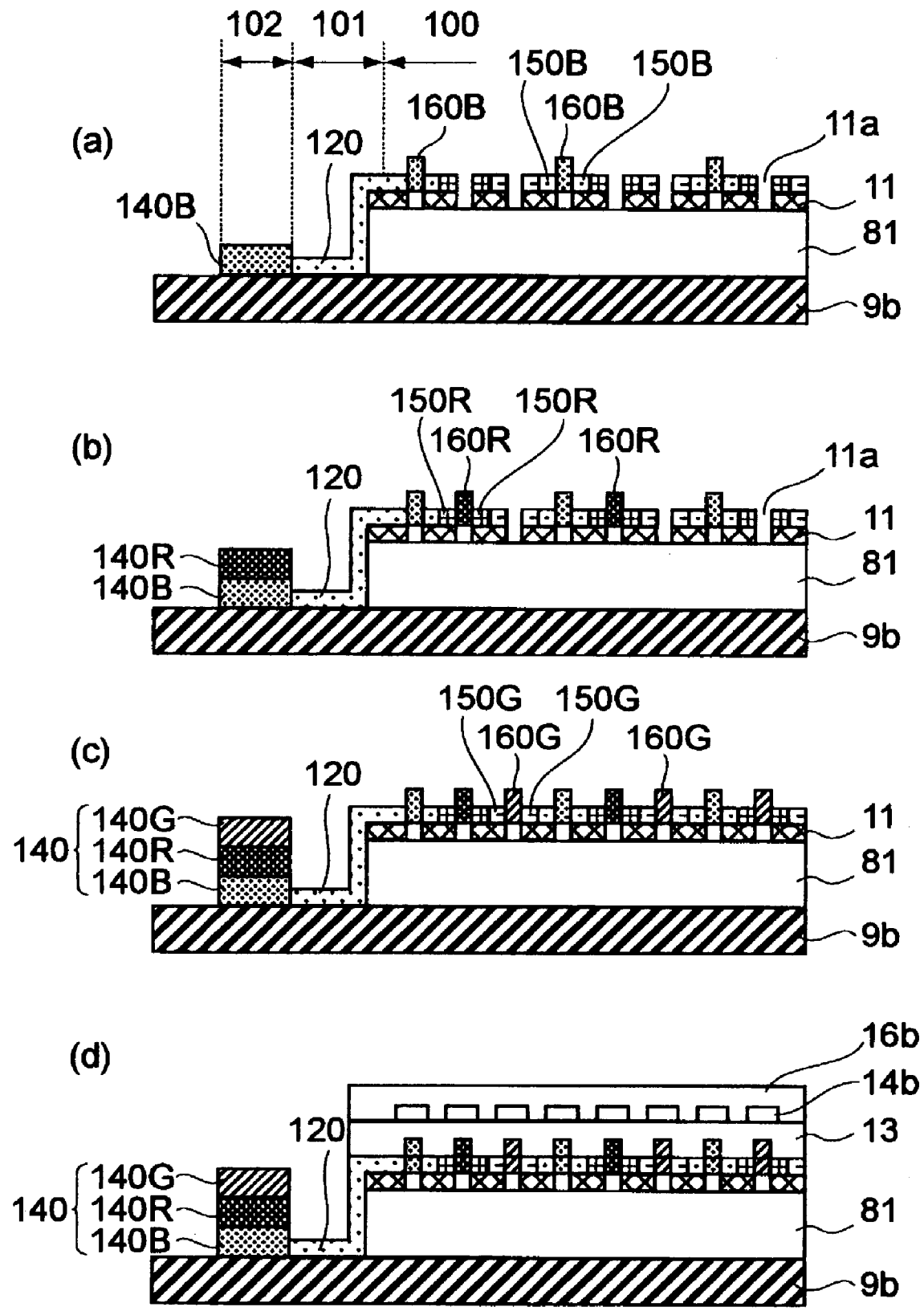
FIG. 9 includes partial cross-sectional views showing a manufacturing process (part 2) for the color filter substrate of the liquid crystal device shown in FIG. 1.

A method for manufacturing the color filter substrate 2b, which constitutes a part of the liquid crystal device, will first be described with reference to FIGS. 8 and 9.

As shown in FIG. 8(a), on the first surface 109b of the substrate 9b, the light scattering resin layer 81, having a thickness of 1.4 to 2.6 μm and being formed of an acrylic or epoxy resin material, is formed in a region which corresponds to the pixel region 100 and a part of the first peripheral region 101. Although being formed on a surface of the light scattering resin layer 81, the irregularities thereof are omitted in the figure.

Next, as shown in FIG. 8(b), after an Al film is formed on the light scattering resin layer 81 by sputtering or the like, the reflective film 11 having openings 11a is formed by a photolithographic method.

Next, after a material for the reflective blue color layer is applied by spin coating or the like to the entire surface of the substrate so as to cover the reflective film 11 and the light scattering resin layer 81, as shown in FIG. 8(c), this coating film is patterned by a photolithographic method to form the first peripheral color layer 120 in the first peripheral region 101 and to form the reflective blue color layers 150B in the pixel region 100 at which the reflective blue color layers are to be disposed.

Next, after a material for the reflective red color layer is applied by spin coating or the like to the entire surface of the substrate so as to cover the reflective film 11, the light scattering resin layer 81, and the color layers 150B and 120, as shown in FIG. 8(d), this coating film is patterned by a photolithographic method to form the reflective red color layers 150R in the pixel region 100 at which the reflective red color layers are to be disposed.

Next, after a material for the reflective green color layer is applied by spin coating or the like to the entire surface of the substrate so as to cover the reflective film 11, the light scattering resin layer 81, and the color layers 150B, 150R, and 120, as shown in FIG. 8(e), this coating film is patterned by a photolithographic method to form the reflective green color layers 150G in the pixel region 100 at which the reflective green color layers are to be disposed.

Next, after a material for the non-reflective blue color layer is applied by spin coating or the like to the entire surface of the substrate so as to cover the reflective film 11, the light scattering resin layer 81, and the color layers 150B, 150R, 150G, and 120, as shown in FIG. 9(a), this coating film is patterned by a photolithographic method to form the non-reflective blue color layers 160B in the pixel region 100 at which the non-reflective blue color layers are to be disposed and to form the second peripheral blue color layer 140B in the second peripheral region 102 at which the laminate film is to be disposed.

Next, after a material for the non-reflective red color layer is applied by spin coating or the like to the entire surface of the substrate so as to cover the reflective film 11, the light scattering resin layer 81, and the color layers 150B, 150R, 150G, 160B, 140B and 120, as shown in FIG. 9(b), this coating film is patterned by a photolithographic method to form the non-reflective red color layers 160R in the pixel region 100 at which the non-reflective red color layers are to be disposed and to form the second peripheral red color layer 140R in the second peripheral region 102 at which the laminate film is to be disposed. The second peripheral red color layer 140R is provided on the second peripheral blue color layer 140B.

Next, after a material for the non-reflective green color layer is applied by spin coating or the like to the entire surface of the substrate so as to cover the reflective film 11, the light scattering resin layer 81, and the color layers 150B, 150R, 150G, 160B, 160R, 140B, 140R, and 120, as shown in FIG. 9(c), this coating film is patterned by a photolithographic method to form the non-reflective green color layers 160G in the pixel region 100 at which the non-reflective green color layers are to be disposed and to form the second peripheral green color layer 140G in the second peripheral region 102 at which the laminate film is to be disposed. The second peripheral green color layer 140G is provided on the second peripheral red color layer 140R. Accordingly, the laminate film 140 composed of the color layers having different colors from each other is formed.

Subsequently, after a transparent resin material is applied to the color layers by spin coating or the like to form the overcoat layer 13, an ITO film is formed on this overcoat layer 13 by sputtering or the like and is then etched by a photo-etching method into a desired pattern, thereby forming the second electrodes 14b. Next, by forming the alignment film 16a, a color filter substrate 2b as shown in FIG. 9(d) is formed.

The color filter substrate 2b thus formed and the counter substrate 2a manufactured by a known method are bonded to each other with a sealing material 3, and liquid crystal is injected between the two substrates, thereby forming a liquid crystal cell. Subsequently, the retardation films 17a and 17b and polarizers 18a and 18b are disposed, and in addition, the backlight 10 is also disposed, thereby forming the liquid crystal device 1.

Second Embodiment

The liquid crystal device of the first embodiment is applied to a transflective type by way of example; however, it is naturally understood that the above liquid crystal device can be applied to a reflective liquid crystal device.

Figure 10:
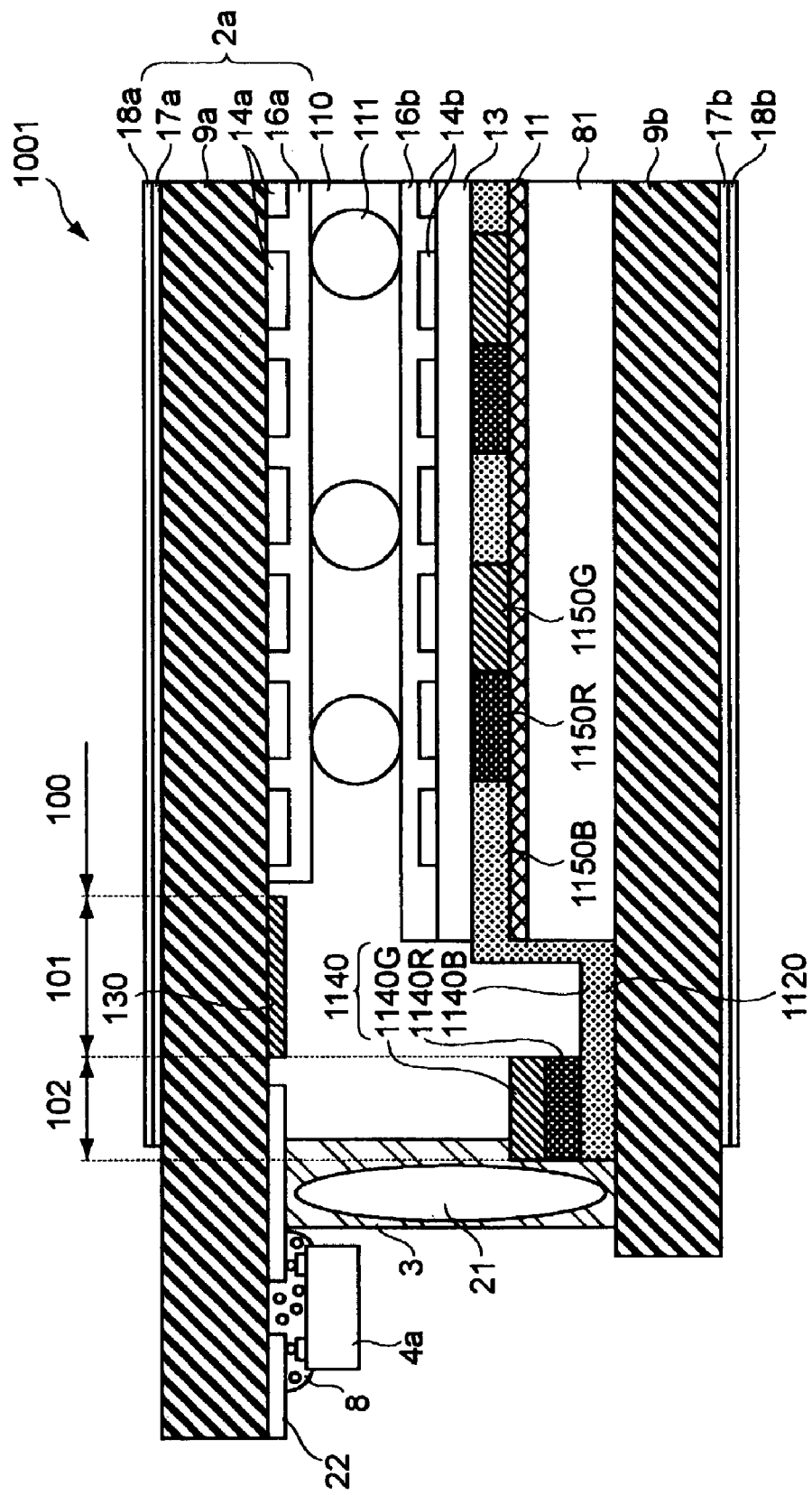
FIG. 10 is a partial, cross-sectional view of a liquid crystal device according to another embodiment of the present invention, and corresponds to the cross-sectional view taken along the line III—III in FIG. 1.
Figure 11:
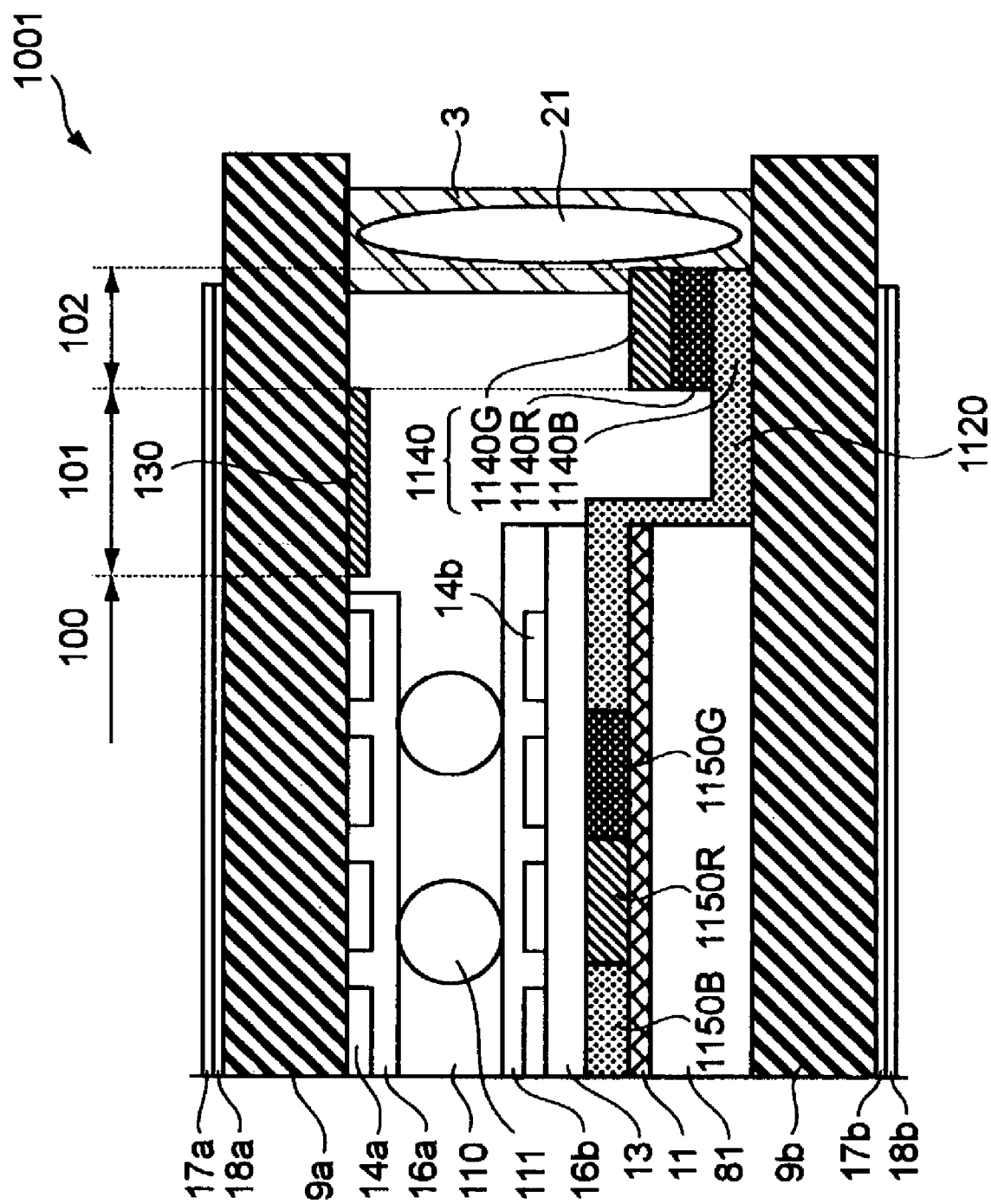
FIG. 11 is a partial, cross-sectional view of a liquid crystal device according to another embodiment, and corresponds to the cross-sectional view taken along the line IV—IV in FIG. 1.
Figure 12:
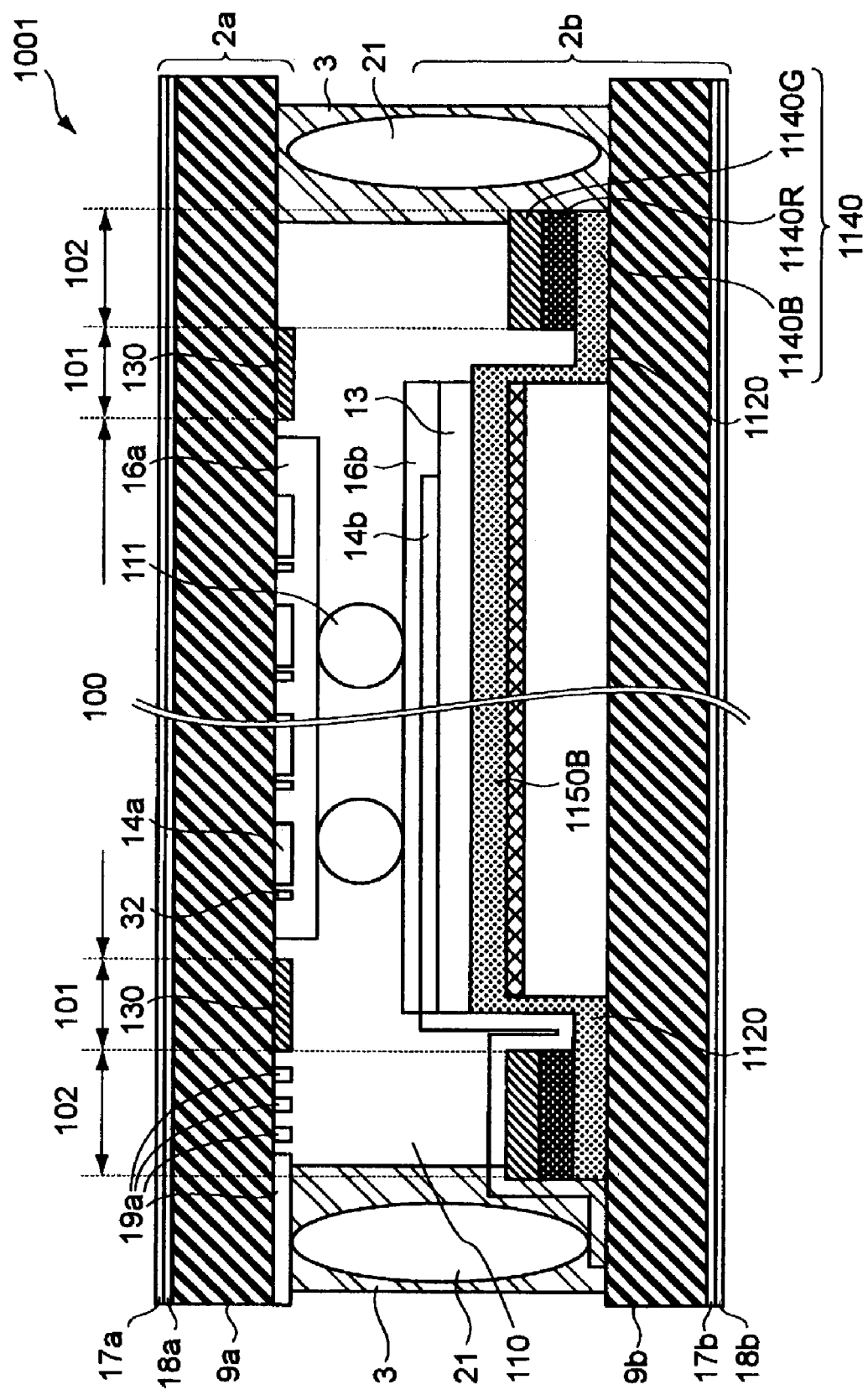
FIG. 12 is a partial, cross-sectional view of a liquid crystal device according to another embodiment, and corresponds to the cross-sectional view taken along the line V—V in FIG. 1.

Next, a reflective liquid crystal device 1001 of a second embodiment will be described with reference to FIGS. 10 to 12. Compared to the liquid crystal device 1 of the fist embodiment, in the liquid crystal device 1001 of the second embodiment, no backlight is provided, no openings 11a are provided in the reflective film 11, and the structure of the color filter film is different. Hereinafter, description of the structure equivalent to that of the first embodiment is omitted, and the points different therefrom will be described. In addition, FIGS. 10 to 12 correspond to FIGS. 3 to 5 for the above first embodiment, respectively.

The reflective liquid crystal device 1001 of this embodiment performs display by using only outside light without a backlight. Hence, the openings 11a formed in the reflective film 11 of the liquid crystal device 1 of the first embodiment are not necessary. In addition, since the non-reflective color layers (transmissive color layers) used in the first embodiment are not necessary, reflective color layers 1150 are only disposed.

The color filter film is composed of reflective blue color layers 1150B as a first color layer, reflective red color layers 1150R as a second color layer, and reflective green color layers 1150G as a third color layer. The color layers 1150 each have a stripe pattern along the second electrodes 14b.

In the first peripheral region 101 of the color filter substrate 2b, a first peripheral blue color layer 1120 having a picture-frame shape is disposed as the first peripheral color layer, the first peripheral blue color layer 1120 being formed of the same material and by the same step as those for the reflective blue color layer 1150B disposed in the pixel region 100. Hence, a step is not formed by the difference in thickness of the color layer in the vicinity of the boundary between the pixel region 100 and the first peripheral region 101. In addition, in this embodiment, the light scattering resin layer 81 and the reflective film 11 are formed so as to at least overlap the inner edge portion of the first peripheral region 101, and the overcoat layer 13 and the alignment film 16b are also formed so as to at least overlap the inner edge portion of the first peripheral region 101. Hence, in the vicinity of the boundary between the pixel region 100 and the first peripheral region 101, the film formed on the color filter substrate 2b becomes continuous, and as a result, the change in film thickness is decreased. Accordingly, compared to traditional structures, the change in cell gap in the vicinity of the boundary between the pixel region 100 and the first peripheral region 101 can be reduced, and degradation of display quality caused by orientation defect of liquid crystal can be prevented.

In this embodiment, blue color is used as the first peripheral color layer, and instead of that, red or green color may be used; however, blue or red color having superior shading properties is preferably used. In addition, as in the first embodiment, in addition to the first peripheral color layer provided in the first peripheral region 101, since the metal film 130 is formed on the counter substrate 2a correspondingly to the first peripheral region 101, the contrast of the pixel region can be enhanced, and hence a liquid crystal device having superior display quality can be obtained.

In the second peripheral region 102 of the color filter substrate 2b, a laminate film 1140 in a picture-frame shape is provided which is composed of three color layers having different colors from each other, that is, a second peripheral blue color layer 1140B, a second peripheral red color layer 1140R, and a second peripheral green color layer 1140G, these second peripheral color layers being formed of the same materials and by the same steps as those for the reflective blue color layer 1150B, the reflective red color layer 1150R, and the reflective green color layer 1150G, respectively, which are disposed in the pixel region 100. As described above, by further forming a shading film of the laminate film 1140 in the second peripheral region 102 surrounding the first peripheral region 101, a liquid crystal device having higher display quality can be obtained. Related to this, in this embodiment, the color layers having three different colors are used to form the laminate film 1140; however, two color layers having different colors may be used, and in this case, a blue color layer and a red color layer are preferably used for forming a laminate film in order of higher shading ability.

Next, a method for manufacturing the above liquid crystal device will be described.

Figure 13:
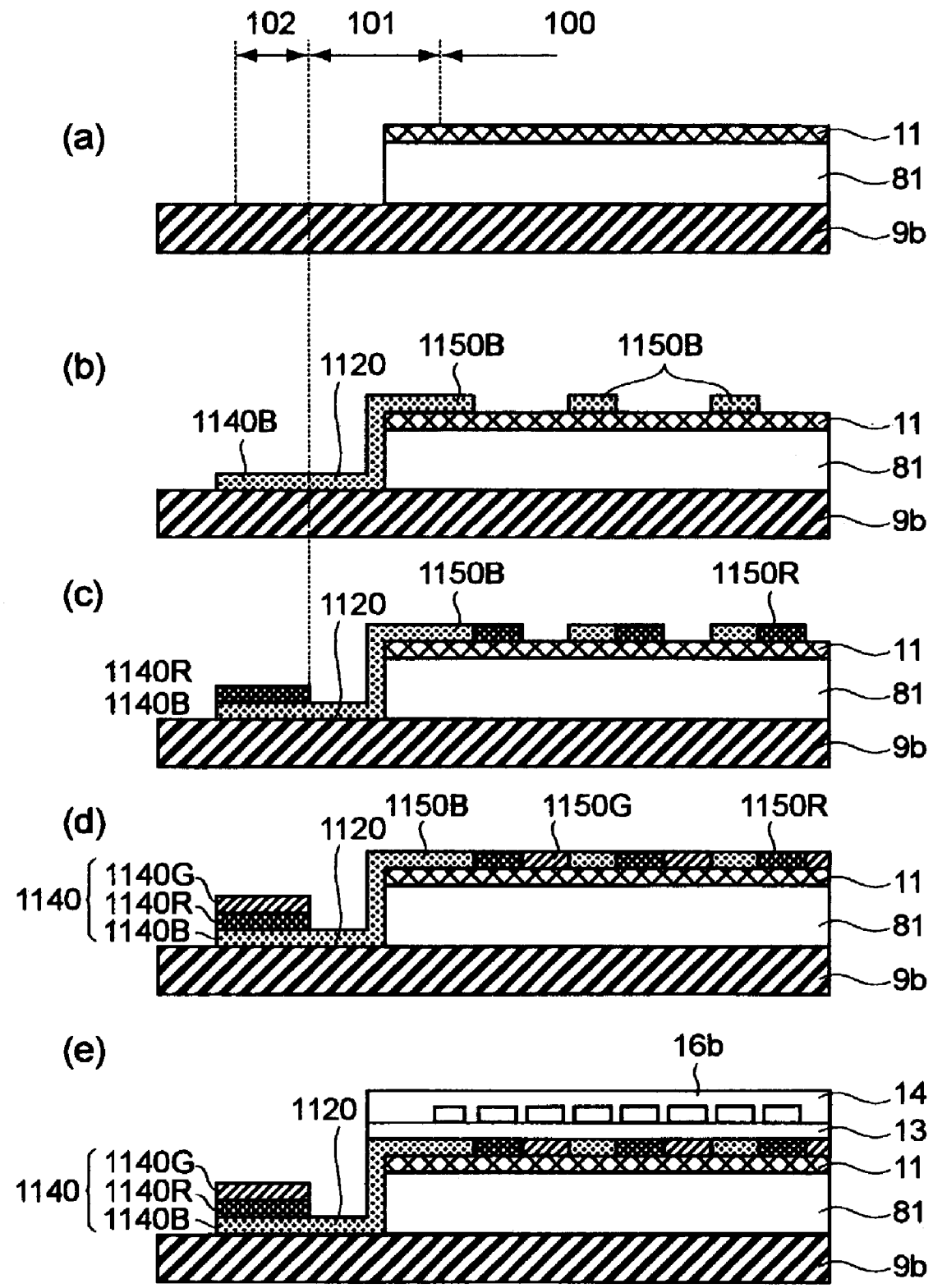
FIG. 13 includes partial, cross-sectional views showing a manufacturing process for a color filter substrate of a liquid crystal device according to another embodiment.

A method for manufacturing the color filter substrate 2b constituting a part of the liquid crystal device is first described with reference to FIG. 13.

As shown in FIG. 13(a), on the first surface 109b of the substrate 9b, the light scattering resin layer 81, having a thickness of 1.4 to 2.6 μm and being formed of an acrylic or epoxy resin material, is formed in a region which corresponds to the pixel region 100 and a part of the first peripheral region 101. Although being formed on a surface of the light scattering resin layer 81, the irregularities thereof are omitted in the figure.

Next, as shown in FIG. 13(b), after an Al film is formed on the light scattering resin layer 81 by sputtering or the like, the reflective film 11 is formed by a photolithographic method.

Next, after a material for the reflective blue color layer is applied by spin coating or the like to the entire surface of the substrate so as to cover the reflective film 11 and the light scattering resin layer 81, as shown in FIG. 13(c), this coating film is patterned by a photolithographic method to form the reflective blue color layers 1150B in the pixel region 100 at which the reflective blue color layers are to be disposed, the first peripheral color layer 1120 in the first peripheral region 101, and the second peripheral color layer 1140B in the second peripheral region 102.

Next, after a material for the reflective red color layer is applied by spin coating or the like to the entire surface of the substrate so as to cover the reflective film 11, the light scattering resin layer 81, the color layers 1150B, 1140B, and 1120, as shown in FIG. 13(d), this coating film is patterned by a photolithographic method to form the second peripheral color layer 1140R in the second peripheral region 102 and to form the reflective red color layers 1150R in the pixel region 100 at which the reflective red color layers are to be disposed.

Next, after a material for the reflective green color layer is applied by spin coating or the like to the entire surface of the substrate so as to cover the reflective film 11, the light scattering resin layer 81, the color layers 1150B, 1150R, 1140B, 1140R, and 1120, as shown in FIG. 13(d), this coating film is patterned by a photolithographic method to form the second peripheral color layer 1140G in the second peripheral region 102 and to form the reflective green color layers 1150G in the pixel region 100 in which the reflective green color layers are to be disposed.

Subsequently, after a transparent resin material is applied to the color layers by spin coating or the like to form the overcoat layer 13, an ITO film is formed on this overcoat layer 13 by sputtering or the like and is then etched by a photo-etching method into a desired pattern, thereby forming the second electrodes 14b. Next, by forming the alignment film 16a, a color filter substrate 2b as shown in FIG. 13(e) is formed.

The color filter substrate 2b thus formed and the counter substrate 2a manufactured by a known method are bonded to each other with the sealing material, and liquid crystal is injected between the two substrates, thereby forming a liquid crystal cell. Subsequently, the retardation films 17a and 17b and polarizers 18a and 18b are disposed, thereby forming the liquid crystal device 1001.

Third Embodiment

Figure 14:
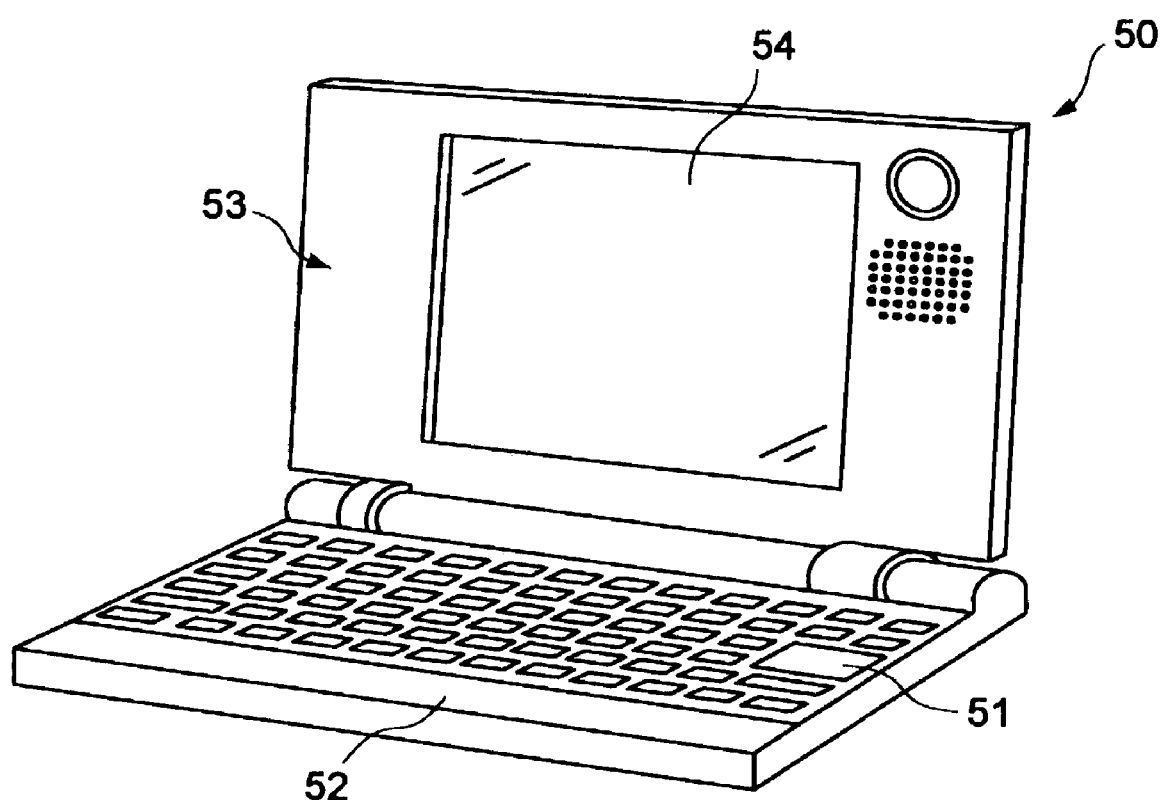
FIG. 14 is a perspective view showing a mobile computer according to another embodiment of an electronic apparatus of the present invention.

FIG. 14 shows a mobile personal computer according to one embodiment of an electronic apparatus of the present invention. A personal computer 50 shown in this figure is formed of a main body 52 including a keyboard 51 and a liquid crystal display unit 53. The liquid crystal display unit 53 has an outer frame, which functions as a housing portion, incorporating a liquid crystal device 54 therein, and this liquid crystal device 54 may be formed, for example, of the liquid crystal device 1 described in the first embodiment.

Fourth Embodiment

Figure 15:
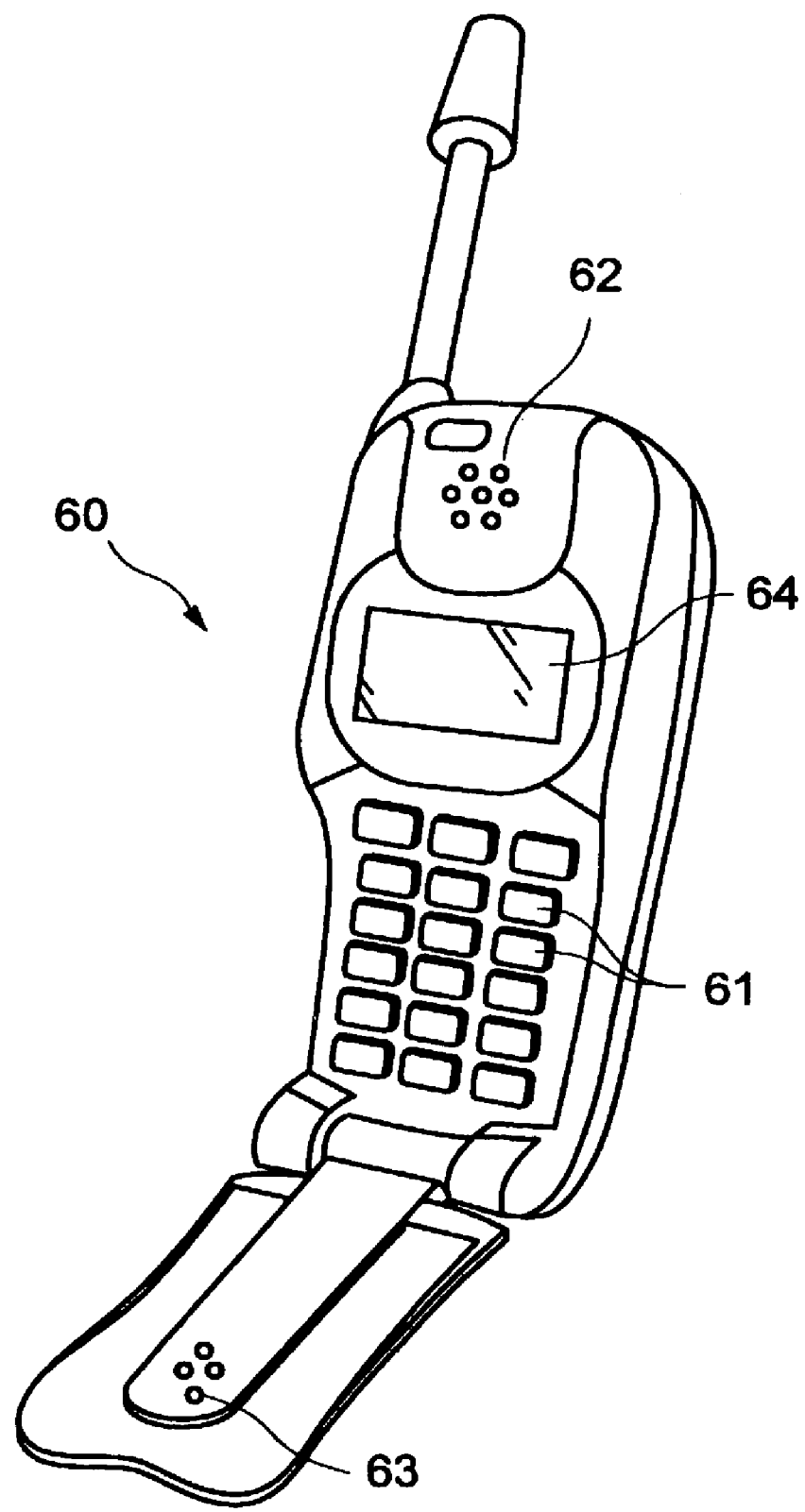
FIG. 15 is a perspective view showing a mobile phone according to still another embodiment of an electronic apparatus of the present invention.

FIG. 15 shows a mobile phone according to another embodiment of an electronic apparatus of the present invention. In addition to a plurality of operation buttons 61, a mobile phone 60 shown in this figure has an outer frame, which has an earpiece 62 and mouthpiece 63 and which is used as a housing portion, incorporating a display device 64 therein. This liquid crystal device 64 may be formed, for example, of the liquid crystal device 1 described in the first embodiment or the liquid crystal device 1001 described in the second embodiment.

Fifth Embodiment

Figure 16:
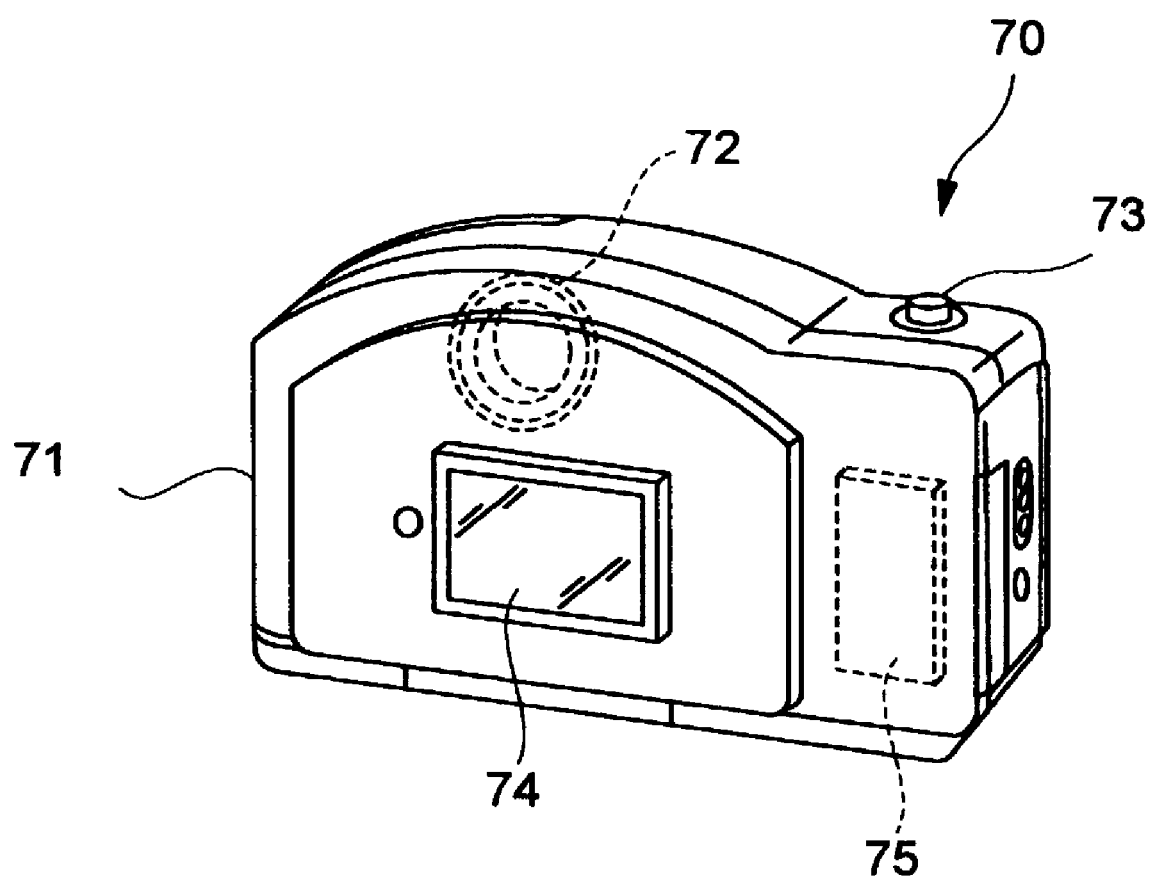
FIG. 16 is a perspective view showing a digital still camera according to still another embodiment of an electronic apparatus of the present invention.

FIG. 16 shows a digital still camera according to still another embodiment of an electronic apparatus of the present invention. Although general cameras expose films by light images of objects, a digital still camera 70 generates an image signal by photoelectric conversion of a light image of an object using an imaging device such as a CCD (Charge Coupled Device).

On the rear surface of a case 71 used as a housing of the digital still camera 70, a liquid crystal device 74 is provided, and display is performed in accordance with image signals supplied by the CCD. Accordingly, the liquid crystal device 74 serves as a viewfinder for displaying an object. In addition, at the front surface side (rear surface side of the structure shown in FIG. 14) of the case 71, a light-receiving unit 72 including optical lenses, the CCD, and the like is provided. The liquid crystal device 74 may be formed, for example, of the liquid crystal device 1 described in the first embodiment or the liquid crystal device 1001 described in the second embodiment. A picture taker recognizes an object image displayed in the display device 74 and then presses a shutter button 73, thereby taking a picture.

Figure 17:
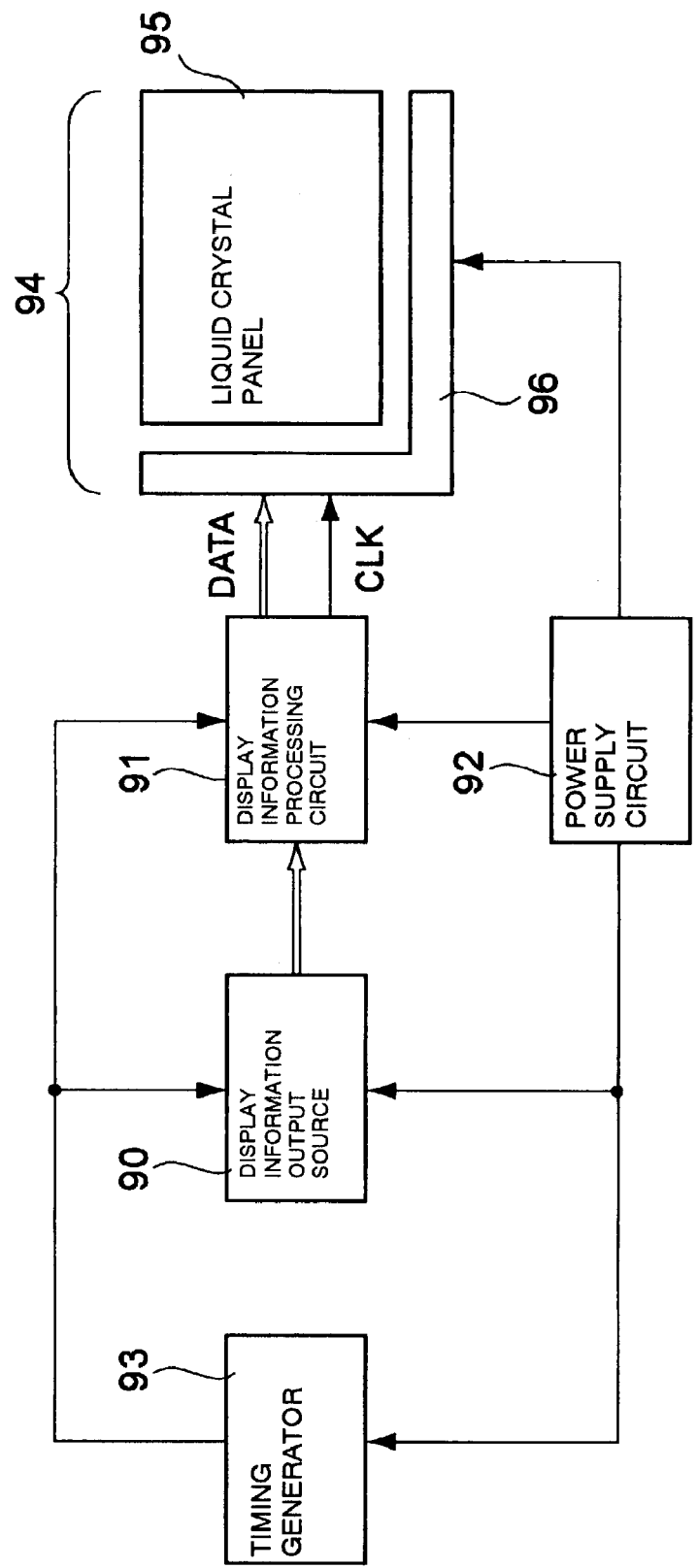
FIG. 17 is a block diagram showing an embodiment of an electronic apparatus of the present invention.

FIG. 17 shows one embodiment of an electrical control system for use in the electronic apparatuses shown in FIGS. 14 to 16. The electrical control system shown in this figure includes a display information output source 90, a display information processing circuit 91, a power supply circuit 92, a timing generator 93, and a liquid crystal device 94 functioning as a display device. In addition, the liquid crystal device 94 comprises a liquid crystal panel 95 and a drive circuit 96. The liquid crystal device 94 may be formed, for example, of the liquid crystal device 1 described in the first embodiment or the liquid crystal device 1001 described in the second embodiment.

The display information output source 90 includes a memory such as a ROM or RAM, storage units such as various disks, a tuned circuit which tunes and outputs digital image signals, and the like, and supplies display information such as image signals having a predetermined format to the display information processing circuit 91 in accordance with various clock signals generated by the timing generator 93.

The display information processing circuit 91 includes known various circuits, such as a serial-to-parallel conversion circuit, an amplifying/polarity reversing circuit, a rotation circuit, a gamma correction circuit, and a clamp circuit, processes input display information, and supplies image signals thereof to the drive circuit 96 together with clock signal CLK. The drive circuit 96 includes a scanning line drive circuit, a data line drive circuit, an inspection circuit, and the like. In addition, the power supply circuit 92 supplies predetermined voltages to respective constituent elements.

Other Embodiments

Heretofore, the present invention is described with reference to the preferred embodiments; however, the present invention is not limited to the above embodiments and may be modified without departing from the spirit and the scope of the present invention.

For example, in the first and the second embodiments, the present invention is applied to the active matrix liquid crystal device using TFDs elements as a switching element; however, in addition to that, the present invention may be applied to an active matrix liquid crystal device using three-terminal switching elements, such as a TFT, as a switching element or to a passive matrix liquid crystal device using no active elements. In addition, the electrooptic device of the present invention is not only applied to liquid crystal devices but is also applied to electrooptic devices such as electroluminescent devices, organic electroluminescent devices, inorganic electroluminescent devices, plasma display devices, field emission display devices, and electrophoretic display devices.

As the electronic apparatuses of the present invention, in addition to personal computers, mobile phones, and digital still cameras, for example, there may be mentioned liquid crystal televisions, viewfinder or direct monitoring video tape recorders, car navigation devices, pagers, electronic notebooks, electronic calculators, word processors, workstations, television phones, and POS terminals. As the display portions of the various electronic apparatuses described above, the liquid crystal device of the present invention may be used.

The entire disclosure of Japanese patent application No. 2002-063852 filed Mar. 8, 2002 is hereby incorporated by reference.

What is claimed is:

1. A color filter substrate comprising:
    a substrate comprising a pixel region and a first peripheral region surrounding the pixel region on a first surface of the substrate;
    a plurality of pixel region color layers disposed on the first surface of the substrate in the pixel region; and
    a peripheral color layer disposed in the first peripheral region, said peripheral color layer being composed of the same material as one pixel region color layer, the peripheral color layer having a single layer structure;
    wherein the substrate further comprises a second peripheral region surrounding the first peripheral region, said second peripheral region including a laminate film which is formed of the same materials as the materials used for at least two of the pixel region color layers.

2. A color filter substrate according to claim 1 wherein the height of the laminate film from the first surface is lower than the height of said plurality of pixel region color layers.

3. A color filter substrate according to claim 2, further comprising a reflective film disposed in the pixel region.

4. A color filter substrate according to claim 3, further comprising a light scattering resin layer disposed in the pixel region, and wherein the reflective film is provided on the light scattering resin layer.

5. A color filter substrate according to claim 4, further comprising a plurality of pixels in the pixel region, wherein the pixels each have reflective regions on which the reflective film is disposed and non-reflective regions on which the reflective film is not disposed.

6. A color filter substrate according to claim 5, wherein the reflective regions are each disposed so as to surround the non-reflective regions.

7. A color filter substrate according to claim 6, wherein the thicknesses of the color layers disposed in the reflective regions are different from those of the color layers disposed in the non-reflective regions.

8. A color filter substrate according to claim 7, wherein said peripheral region color layer is composed of the same material as that for one color layer of said color layers disposed in the reflective regions.

9. A color filter substrate according to claim 7, wherein the laminate film is composed of the same materials as those materials used for at least two color layers of said color layers disposed in the non-reflective regions.

10. A color filter substrate according to claim 9, wherein the peripheral region color layer is blue in color.

11. An electrooptic device comprising:

a color filter substrate including:

a substrate having a pixel region and a first peripheral region surrounding the pixel region on a first surface of the substrate;

a plurality of pixel region color layers disposed on the first surface of the substrate in the pixel region;

a peripheral region color layer which is disposed in the first peripheral region and which is composed of the same material as one pixel region color layer;

a counter substrate disposed to oppose the color filter substrate;

an electrooptic material provided between the color filter substrate and the counter substrate; and a metal film on the counter substrate so as to correspond to the first peripheral region of the color filter substrate.

12. An electrooptic device according to claim 11, wherein the metal film comprises tantalum.

13. An electrooptic device according to claim 12, further comprising a backlight which emits light to the color filter substrate and the counter substrate with the electrooptic material provided therebetween.

14. An electrooptic device according to claim 13, wherein the electrooptic material comprises liquid crystal.

15. An electrooptic device according to claim 14 which is incorporated into electronic apparatus.

* * * * *